(12) United States Patent
Marcouiller et al.

(10) Patent No.: US 9,146,362 B2
(45) Date of Patent: Sep. 29, 2015

(54) INSERTION AND REMOVAL TOOL FOR A FIBER OPTIC FERRULE ALIGNMENT SLEEVE

(71) Applicant: ADC Telecommunications, Inc., Berwyn, PA (US)

(72) Inventors: Thomas Marcouiller, Shakopee, MN (US); Mandy Lea Trnka, Lonsdale, MN (US); Oscar Fernando Bran de León, Belle Plaine, MN (US)

(73) Assignee: ADC Telecommunications, Inc., Berwyn, PA (US)

( * ) Notice: Subject to any disclaimer, the term of this patent is extended or adjusted under 35 U.S.C. 154(b) by 0 days.

(21) Appl. No.: 14/026,056

(22) Filed: Sep. 13, 2013

(65) Prior Publication Data

US 2014/0082913 A1    Mar. 27, 2014

Related U.S. Application Data

(60) Provisional application No. 61/770,178, filed on Feb. 27, 2013, provisional application No. 61/704,271, filed on Sep. 21, 2012.

(51) Int. Cl.
*G02B 6/38* (2006.01)

(52) U.S. Cl.
CPC ............ *G02B 6/3833* (2013.01); *G02B 6/3874* (2013.01); *G02B 6/3898* (2013.01);
(Continued)

(58) Field of Classification Search
CPC .............................. G02B 6/3825; G02B 6/3874
USPC ........ 29/426.1, 428, 235, 761–764, 758–759; 385/55–60, 76, 95–99
See application file for complete search history.

(56) References Cited

U.S. PATENT DOCUMENTS 2,331,920 A * 10/1943 McMaster ........................ 29/225
3,624,887 A * 12/1971 Hilbert ............................. 29/764
(Continued)

FOREIGN PATENT DOCUMENTS

AU          696950       8/1996
CA         2149681      12/1995
(Continued)

OTHER PUBLICATIONS

ADC Telecommunications, Inc., technical drawings for "Retainer Staright [sic] Removable SC," which show a latch design, Jan. 17, 2006, 2 pages.
(Continued)

*Primary Examiner* — Minh Trinh
(74) *Attorney, Agent, or Firm* — Merchant & Gould P.C.

(57) ABSTRACT

A tool is disclosed. The tool is for inserting a ferrule alignment sleeve within a sleeve mount of a fiber optic adapter, wherein the sleeve mount defines an axial bore and radially inwardly extending fingers for retaining the ferrule alignment sleeve therewithin. The tool includes a handle and a pin extending from the handle, the pin configured to slidably receive the ferrule alignment sleeve, the pin defining longitudinal keys for mating with gaps defined between the radially inwardly extending fingers of the sleeve mount, wherein the tool can be used as a ferrule alignment sleeve insertion tool if the pin is inserted into the axial bore in a first orientation and is configured to be used as a ferrule alignment sleeve removal tool if the pin is inserted into the axial bore in a second orientation from an opposite end of the axial bore.

8 Claims, 18 Drawing Sheets

(52) U.S. Cl.
CPC ......... *G02B6/3825* (2013.01); *Y10T 29/49815* (2015.01); *Y10T 29/49826* (2015.01); *Y10T 29/53657* (2015.01)

(56) References Cited

U.S. PATENT DOCUMENTS

| | | | |
|---|---|---|---|
| 4,611,875 A | 9/1986 | Clarke et al. | |
| 4,736,100 A | 4/1988 | Vastagh | |
| 4,744,140 A * | 5/1988 | Bright | 29/741 |
| 4,747,020 A | 5/1988 | Brickley et al. | |
| 4,792,203 A | 12/1988 | Nelson et al. | |
| 4,824,196 A | 4/1989 | Bylander | |
| 4,861,134 A | 8/1989 | Alameel et al. | |
| 4,900,123 A | 2/1990 | Barlow et al. | |
| 4,913,522 A | 4/1990 | Nolf et al. | |
| 4,948,220 A | 8/1990 | Violo et al. | |
| 4,953,929 A | 9/1990 | Basista et al. | |
| 4,995,688 A | 2/1991 | Anton et al. | |
| 5,023,646 A | 6/1991 | Ishida et al. | |
| 5,058,983 A | 10/1991 | Corke et al. | |
| 5,067,783 A | 11/1991 | Lampert | |
| 5,073,042 A | 12/1991 | Mulholland et al. | |
| 5,076,656 A | 12/1991 | Briggs et al. | |
| 5,076,688 A | 12/1991 | Bowen et al. | |
| 5,142,598 A | 8/1992 | Tabone | |
| 5,210,810 A | 5/1993 | Darden et al. | |
| 5,212,752 A | 5/1993 | Stephenson et al. | |
| 5,214,735 A | 5/1993 | Henneberger et al. | |
| 5,224,186 A | 6/1993 | Kishimoto et al. | |
| 5,233,674 A | 8/1993 | Vladic | |
| 5,274,729 A | 12/1993 | King et al. | |
| 5,274,731 A | 12/1993 | White | |
| 5,317,663 A | 5/1994 | Beard et al. | |
| 5,333,221 A | 7/1994 | Briggs et al. | |
| 5,333,222 A | 7/1994 | Belenkiy et al. | |
| 5,359,688 A | 10/1994 | Underwood | |
| 5,363,465 A | 11/1994 | Korkowski et al. | |
| 5,367,598 A | 11/1994 | Devenish, III et al. | |
| 5,402,515 A | 3/1995 | Vidacovich et al. | |
| 5,408,557 A | 4/1995 | Hsu | |
| RE34,955 E | 5/1995 | Anton et al. | |
| 5,420,958 A | 5/1995 | Henson et al. | |
| 5,442,726 A | 8/1995 | Howard et al. | |
| 5,448,015 A | 9/1995 | Jamet et al. | |
| 5,461,690 A | 10/1995 | Lampert | |
| 5,469,526 A | 11/1995 | Rawlings | |
| 5,481,634 A | 1/1996 | Anderson et al. | |
| 5,497,444 A | 3/1996 | Wheeler | |
| 5,506,922 A | 4/1996 | Grois et al. | |
| 5,511,144 A | 4/1996 | Hawkins et al. | |
| 5,542,015 A | 7/1996 | Hultermans | |
| 5,579,425 A | 11/1996 | Lampert et al. | |
| 5,638,474 A | 6/1997 | Lampert et al. | |
| 5,647,043 A | 7/1997 | Anderson et al. | |
| 5,675,682 A | 10/1997 | De Marchi | |
| 5,708,751 A | 1/1998 | Mattei | |
| 5,717,810 A | 2/1998 | Wheeler | |
| 5,719,977 A | 2/1998 | Lampert et al. | |
| 5,734,776 A | 3/1998 | Puetz | |
| 5,737,464 A | 4/1998 | Underwood et al. | |
| 5,764,834 A | 6/1998 | Hultermans | |
| 5,764,844 A | 6/1998 | Mendes | |
| 5,774,612 A | 6/1998 | Belenkiy et al. | |
| 5,778,132 A | 7/1998 | Csipkes et al. | |
| 5,784,515 A | 7/1998 | Tamaru et al. | |
| 5,823,646 A | 10/1998 | Arizpe et al. | |
| 5,825,955 A | 10/1998 | Ernst et al. | |
| 5,838,855 A | 11/1998 | Stephenson | |
| 5,883,995 A | 3/1999 | Lu | |
| 5,887,095 A | 3/1999 | Nagase et al. | |
| 5,909,526 A | 6/1999 | Roth et al. | |
| 5,915,058 A | 6/1999 | Clairardin et al. | |
| 5,923,805 A | 7/1999 | Anderson et al. | |
| 5,930,425 A | 7/1999 | Abel et al. | |
| 5,945,633 A | 8/1999 | Ott et al. | |
| 5,956,444 A | 9/1999 | Duda et al. | |
| 5,969,294 A | 10/1999 | Eberle et al. | |
| 5,975,769 A | 11/1999 | Larson et al. | |
| 5,984,531 A | 11/1999 | Lu | |
| 5,987,203 A | 11/1999 | Abel et al. | |
| 5,993,071 A | 11/1999 | Hultermans | |
| 6,017,153 A | 1/2000 | Carlisle et al. | |
| 6,017,154 A | 1/2000 | Carlisle et al. | |
| 6,024,498 A | 2/2000 | Carlisle et al. | |
| 6,027,252 A | 2/2000 | Erdman et al. | |
| 6,041,155 A | 3/2000 | Anderson et al. | |
| 6,044,193 A | 3/2000 | Szentesi et al. | |
| 6,061,492 A | 5/2000 | Strause et al. | |
| 6,069,797 A | 5/2000 | Widmayer et al. | |
| 6,076,973 A | 6/2000 | Lu | |
| 6,076,974 A | 6/2000 | Carlisle et al. | |
| 6,076,975 A | 6/2000 | Roth | |
| 6,079,881 A | 6/2000 | Roth | |
| 6,081,647 A | 6/2000 | Roth et al. | |
| 6,096,797 A | 8/2000 | Prantl et al. | |
| 6,102,581 A | 8/2000 | Deveau et al. | |
| 6,142,676 A | 11/2000 | Lu | |
| 6,149,315 A | 11/2000 | Stephenson | |
| 6,154,597 A | 11/2000 | Roth | |
| 6,155,146 A * | 12/2000 | Andrews et al. | 81/461 |
| 6,160,946 A | 12/2000 | Thompson et al. | |
| 6,188,687 B1 | 2/2001 | Mussman et al. | |
| 6,188,825 B1 | 2/2001 | Bandy et al. | |
| 6,196,731 B1 | 3/2001 | Carlisle et al. | |
| 6,196,733 B1 | 3/2001 | Wild | |
| 6,206,581 B1 | 3/2001 | Driscoll et al. | |
| 6,208,796 B1 | 3/2001 | Williams Vigliaturo | |
| 6,217,230 B1 | 4/2001 | Matsushita | |
| 6,227,717 B1 | 5/2001 | Ott et al. | |
| 6,234,683 B1 | 5/2001 | Waldron et al. | |
| 6,234,685 B1 | 5/2001 | Carlisle et al. | |
| 6,236,795 B1 | 5/2001 | Rodgers | |
| 6,240,229 B1 | 5/2001 | Roth | |
| 6,247,849 B1 | 6/2001 | Liu | |
| 6,250,817 B1 | 6/2001 | Lampert et al. | |
| 6,256,443 B1 | 7/2001 | Uruno | |
| 6,259,850 B1 | 7/2001 | Crosby, Jr. et al. | |
| 6,259,856 B1 | 7/2001 | Shahid | |
| 6,271,484 B1 | 8/2001 | Tokutsu | |
| 6,278,829 B1 | 8/2001 | BuAbbud et al. | |
| 6,287,018 B1 | 9/2001 | Andrews et al. | |
| 6,293,710 B1 | 9/2001 | Lampert et al. | |
| 6,296,398 B1 | 10/2001 | Lu | |
| 6,318,903 B1 | 11/2001 | Andrews et al. | |
| 6,325,547 B1 | 12/2001 | Cammons et al. | |
| 6,325,549 B1 | 12/2001 | Shevchuk | |
| RE37,489 E | 1/2002 | Anton et al. | |
| 6,347,888 B1 | 2/2002 | Puetz | |
| 6,356,697 B1 | 3/2002 | Braga et al. | |
| 6,357,934 B1 | 3/2002 | Driscoll et al. | |
| 6,363,200 B1 | 3/2002 | Thompson et al. | |
| 6,364,685 B1 | 4/2002 | Manning | |
| 6,367,984 B1 | 4/2002 | Stephenson et al. | |
| 6,385,381 B1 | 5/2002 | Janus et al. | |
| 6,409,392 B1 | 6/2002 | Lampert et al. | |
| 6,411,767 B1 | 6/2002 | Burrous et al. | |
| 6,418,262 B1 | 7/2002 | Puetz et al. | |
| 6,419,402 B1 | 7/2002 | Zimmel | |
| 6,424,781 B1 | 7/2002 | Puetz et al. | |
| 6,425,694 B1 | 7/2002 | Szilagyi et al. | |
| 6,431,762 B1 | 8/2002 | Taira et al. | |
| 6,434,313 B1 | 8/2002 | Clapp, Jr. et al. | |
| 6,443,627 B1 | 9/2002 | Anderson et al. | |
| 6,452,925 B1 | 9/2002 | Sistanizadeh et al. | |
| 6,453,033 B1 | 9/2002 | Little et al. | |
| 6,464,402 B1 | 10/2002 | Andrews et al. | |
| 6,471,416 B2 | 10/2002 | Lu | |
| D466,087 S | 11/2002 | Cuny et al. | |
| 6,480,487 B1 | 11/2002 | Wegleitner et al. | |
| 6,483,977 B2 | 11/2002 | Battey et al. | |
| 6,496,640 B1 | 12/2002 | Harvey et al. | |
| 6,504,988 B1 | 1/2003 | Trebesch et al. | |
| 6,508,593 B1 | 1/2003 | Farnsworth et al. | |
| 6,511,230 B1 | 1/2003 | Connelly et al. | |

(56) References Cited

U.S. PATENT DOCUMENTS

| | | | |
|---|---|---|---|
| 6,532,332 B2 | 3/2003 | Solheid et al. |
| 6,535,682 B1 | 3/2003 | Puetz et al. |
| 6,539,147 B1 | 3/2003 | Mahony |
| 6,539,160 B2 | 3/2003 | Battey et al. |
| 6,542,688 B1 | 4/2003 | Battey et al. |
| 6,550,979 B1 | 4/2003 | Fleenor et al. |
| 6,554,485 B1 | 4/2003 | Beatty et al. |
| 6,556,763 B1 | 4/2003 | Puetz et al. |
| 6,565,262 B2 | 5/2003 | Childers et al. |
| 6,577,595 B1 | 6/2003 | Counterman |
| 6,588,938 B1 | 7/2003 | Lampert et al. |
| 6,591,051 B2 | 7/2003 | Solheid et al. |
| 6,597,670 B1 | 7/2003 | Tweedy et al. |
| 6,614,980 B1 | 9/2003 | Mahony |
| 6,619,856 B1 | 9/2003 | Lampert et al. |
| 6,621,975 B2 | 9/2003 | Laporte et al. |
| 6,623,170 B2 | 9/2003 | Petrillo |
| 6,625,375 B1 | 9/2003 | Mahony |
| 6,629,782 B2 | 10/2003 | McPhee et al. |
| 6,631,237 B2 | 10/2003 | Knudsen et al. |
| RE38,311 E | 11/2003 | Wheeler |
| 6,652,155 B2 | 11/2003 | Lampert |
| 6,654,536 B2 | 11/2003 | Battey et al. |
| 6,661,961 B1 | 12/2003 | Allen et al. |
| 6,663,292 B1 | 12/2003 | Shirakawa |
| 6,663,293 B2 | 12/2003 | Lampert et al. |
| 6,668,127 B1 | 12/2003 | Mahony |
| 6,672,774 B2 | 1/2004 | Theuerkorn et al. |
| 6,672,898 B2 | 1/2004 | Kahle et al. |
| 6,678,457 B2 | 1/2004 | Kim et al. |
| 6,705,765 B2 | 3/2004 | Lampert et al. |
| 6,705,768 B2 | 3/2004 | Serizawa |
| 6,712,523 B2 | 3/2004 | Zimmel |
| 6,722,790 B2 | 4/2004 | Caveney |
| 6,752,538 B1 | 6/2004 | Bates, III |
| 6,755,574 B2 | 6/2004 | Fujiwara et al. |
| 6,760,530 B1 | 7/2004 | Mandry |
| 6,760,531 B1 | 7/2004 | Solheid et al. |
| 6,768,860 B2 | 7/2004 | Liberty |
| 6,778,752 B2 | 8/2004 | Laporte et al. |
| 6,788,786 B1 | 9/2004 | Kessler et al. |
| 6,789,954 B2 | 9/2004 | Lampert et al. |
| 6,792,190 B2 | 9/2004 | Xin |
| 6,792,191 B1 | 9/2004 | Clapp, Jr. et al. |
| 6,799,898 B2 | 10/2004 | Cheng et al. |
| 6,815,612 B2 | 11/2004 | Bloodworth et al. |
| 6,817,780 B2 | 11/2004 | Ngo |
| 6,848,836 B2 | 2/2005 | Ueda et al. |
| 6,850,685 B2 | 2/2005 | Tinucci et al. |
| 6,853,795 B2 | 2/2005 | Dagley et al. |
| 6,859,604 B2 * | 2/2005 | Marrs ........................ 385/134 |
| 6,870,734 B2 | 3/2005 | Mertesdorf et al. |
| 6,901,200 B2 | 5/2005 | Schray |
| 6,909,833 B2 | 6/2005 | Henschel et al. |
| 6,910,807 B2 | 6/2005 | Lu |
| 6,913,396 B2 | 7/2005 | Nelson |
| 6,916,120 B2 | 7/2005 | Zimmel et al. |
| 6,918,704 B2 | 7/2005 | Marrs et al. |
| 6,920,274 B2 | 7/2005 | Rapp et al. |
| 6,925,241 B2 | 8/2005 | Bohle et al. |
| 6,950,593 B2 | 9/2005 | Hodge et al. |
| 6,980,725 B1 | 12/2005 | Swieconek |
| 6,983,095 B2 | 1/2006 | Reagan et al. |
| 6,984,074 B2 | 1/2006 | Makhlin et al. |
| 7,018,108 B2 | 3/2006 | Makhlin et al. |
| 7,029,322 B2 | 4/2006 | Ernst et al. |
| 7,088,899 B2 | 8/2006 | Reagan et al. |
| 7,103,255 B2 | 9/2006 | Reagan et al. |
| 7,104,702 B2 | 9/2006 | Barnes et al. |
| 7,118,288 B2 | 10/2006 | Lu |
| 7,121,165 B2 * | 10/2006 | Yamakawa ........................ 81/6 |
| 7,142,764 B2 | 11/2006 | Allen et al. |
| 7,146,089 B2 | 12/2006 | Reagan et al. |
| 7,171,102 B2 | 1/2007 | Reagan et al. |
| 7,198,409 B2 | 4/2007 | Smith et al. |
| 7,200,317 B2 | 4/2007 | Reagan et al. |
| 7,201,518 B2 | 4/2007 | Holmquist |
| 7,204,644 B2 | 4/2007 | Barnes et al. |
| 7,218,827 B2 | 5/2007 | Vongseng et al. |
| 7,233,731 B2 | 6/2007 | Solheid et al. |
| 7,234,877 B2 | 6/2007 | Sedor |
| 7,246,950 B2 | 7/2007 | Lu |
| 7,258,493 B2 | 8/2007 | Milette |
| 7,277,620 B2 | 10/2007 | Vongseng et al. |
| 7,281,859 B2 | 10/2007 | Mudd et al. |
| 7,283,718 B2 | 10/2007 | Zaina et al. |
| 7,369,741 B2 | 5/2008 | Reagan et al. |
| 7,376,323 B2 | 5/2008 | Zimmel |
| 7,377,697 B2 | 5/2008 | Kahle et al. |
| 7,384,201 B2 | 6/2008 | Lu |
| 7,387,447 B2 | 6/2008 | Mudd et al. |
| 7,390,203 B2 | 6/2008 | Murano et al. |
| 7,400,813 B2 | 7/2008 | Zimmel |
| 7,400,816 B2 | 7/2008 | Reagan et al. |
| 7,407,330 B2 | 8/2008 | Smith et al. |
| 7,416,349 B2 | 8/2008 | Kramer |
| 7,457,503 B2 | 11/2008 | Solheid et al. |
| 7,471,869 B2 | 12/2008 | Reagan et al. |
| 7,473,037 B2 | 1/2009 | Robertson et al. |
| 7,503,702 B2 | 3/2009 | Lu |
| 7,515,805 B2 | 4/2009 | Vongseng et al. |
| 7,519,259 B2 | 4/2009 | Smith et al. |
| 7,534,115 B2 | 5/2009 | Murano et al. |
| 7,583,883 B2 | 9/2009 | Kowalczyk et al. |
| 7,641,398 B2 | 1/2010 | O'Riorden et al. |
| 7,654,749 B2 | 2/2010 | Lu |
| 7,658,551 B1 | 2/2010 | Wu et al. |
| 7,674,046 B2 | 3/2010 | Milette |
| 7,690,848 B2 | 4/2010 | Faika et al. |
| 7,712,970 B1 | 5/2010 | Lee |
| 7,862,243 B2 | 1/2011 | Kahle et al. |
| 7,874,738 B2 | 1/2011 | Lu |
| 8,123,415 B2 | 2/2012 | Kahle et al. |
| 8,186,890 B2 | 5/2012 | Lu |
| 8,313,248 B2 | 11/2012 | Kahle et al. |
| 8,382,382 B2 | 2/2013 | Nelson |
| 8,636,422 B2 | 1/2014 | Kahle et al. |
| 8,845,205 B2 | 9/2014 | Nelson |
| 2001/0001270 A1 | 5/2001 | Williams Vigliaturo |
| 2002/0034290 A1 | 3/2002 | Pershan |
| 2002/0131722 A1 | 9/2002 | Lampert et al. |
| 2002/0166227 A1* | 11/2002 | Holland et al. ................. 29/759 |
| 2002/0176681 A1 | 11/2002 | Puetz et al. |
| 2002/0181893 A1 | 12/2002 | White et al. |
| 2002/0197018 A1 | 12/2002 | Lampert |
| 2003/0002812 A1 | 1/2003 | Lampert |
| 2003/0007767 A1 | 1/2003 | Douglas et al. |
| 2003/0095772 A1 | 5/2003 | Solheid et al. |
| 2003/0113086 A1 | 6/2003 | Jun et al. |
| 2003/0147597 A1 | 8/2003 | Duran |
| 2003/0156797 A1 | 8/2003 | Gherardini |
| 2003/0161586 A1 | 8/2003 | Hirabayashi |
| 2003/0174996 A1 | 9/2003 | Henschel et al. |
| 2003/0207601 A1 | 11/2003 | Adachi |
| 2003/0223703 A1 | 12/2003 | Chen et al. |
| 2003/0231836 A1 | 12/2003 | Robertson et al. |
| 2004/0052474 A1 | 3/2004 | Lampert et al. |
| 2004/0074852 A1 | 4/2004 | Knudsen et al. |
| 2004/0126069 A1 | 7/2004 | Jong et al. |
| 2004/0151437 A1 | 8/2004 | Marrs et al. |
| 2004/0163238 A1* | 8/2004 | Holliday ........................ 29/761 |
| 2004/0165852 A1 | 8/2004 | Erwin et al. |
| 2004/0228598 A1 | 11/2004 | Allen et al. |
| 2004/0247252 A1 | 12/2004 | Ehrenreich et al. |
| 2004/0264873 A1 | 12/2004 | Smith et al. |
| 2004/0264875 A1 | 12/2004 | Makhlin et al. |
| 2004/0264877 A1 | 12/2004 | Makhlin et al. |
| 2005/0002633 A1 | 1/2005 | Solheid et al. |
| 2005/0018973 A1 | 1/2005 | Loder et al. |
| 2005/0036744 A1 | 2/2005 | Caveney et al. |
| 2005/0074211 A1 | 4/2005 | Greub |
| 2005/0117850 A1 | 6/2005 | Milette |
| 2005/0129379 A1 | 6/2005 | Reagan et al. |
| 2005/0135753 A1 | 6/2005 | Eigenmann et al. |

(56) References Cited

U.S. PATENT DOCUMENTS

| | | | |
|---|---|---|---|
| 2005/0147358 A1 | 7/2005 | Zaina et al. | |
| 2005/0163448 A1 | 7/2005 | Blackwell, Jr. et al. | |
| 2005/0213890 A1 | 9/2005 | Barnes et al. | |
| 2005/0213892 A1 | 9/2005 | Barnes et al. | |
| 2005/0213897 A1* | 9/2005 | Palmer et al. | 385/95 |
| 2006/0002662 A1 | 1/2006 | Manning et al. | |
| 2006/0018604 A1 | 1/2006 | Bareel et al. | |
| 2006/0083475 A1 | 4/2006 | Grubish et al. | |
| 2006/0089049 A1 | 4/2006 | Sedor | |
| 2006/0093274 A1 | 5/2006 | Kahle et al. | |
| 2006/0093301 A1 | 5/2006 | Zimmel et al. | |
| 2006/0115219 A1 | 6/2006 | Mudd et al. | |
| 2006/0115220 A1 | 6/2006 | Elkins, II et al. | |
| 2006/0154529 A1 | 7/2006 | Erdman et al. | |
| 2006/0204200 A1 | 9/2006 | Lampert et al. | |
| 2006/0269194 A1 | 11/2006 | Luther et al. | |
| 2007/0098331 A1 | 5/2007 | Mudd et al. | |
| 2007/0223863 A1 | 9/2007 | Robertson et al. | |
| 2007/0280599 A1 | 12/2007 | Faika et al. | |
| 2008/0008436 A1 | 1/2008 | Reagan et al. | |
| 2008/0013889 A1 | 1/2008 | Milette | |
| 2008/0013910 A1 | 1/2008 | Reagan et al. | |
| 2008/0019644 A1 | 1/2008 | Smith et al. | |
| 2008/0019655 A1 | 1/2008 | Vongseng et al. | |
| 2008/0025684 A1 | 1/2008 | Vongseng et al. | |
| 2008/0069501 A1 | 3/2008 | Mudd et al. | |
| 2008/0075411 A1 | 3/2008 | Solheid et al. | |
| 2008/0175540 A1 | 7/2008 | Zheng et al. | |
| 2008/0175545 A1 | 7/2008 | Zheng et al. | |
| 2008/0226236 A1 | 9/2008 | Pepin et al. | |
| 2008/0260332 A1 | 10/2008 | Murano et al. | |
| 2008/0317413 A1 | 12/2008 | Faika et al. | |
| 2008/0317425 A1 | 12/2008 | Smith et al. | |
| 2009/0074372 A1 | 3/2009 | Solheid et al. | |
| 2009/0087157 A1 | 4/2009 | Smith et al. | |
| 2009/0190896 A1 | 7/2009 | Smith et al. | |
| 2009/0196565 A1 | 8/2009 | Vongseng et al. | |
| 2009/0214164 A1 | 8/2009 | Nakagawa | |
| 2009/0285541 A1 | 11/2009 | Kowalczyk et al. | |
| 2009/0290839 A1 | 11/2009 | Lin et al. | |
| 2010/0054668 A1 | 3/2010 | Nelson | |
| 2010/0111484 A1 | 5/2010 | Allen | |
| 2011/0229082 A1 | 9/2011 | Kahle et al. | |
| 2013/0071066 A1 | 3/2013 | Lu | |
| 2013/0177279 A1 | 7/2013 | Nelson | |
| 2013/0183018 A1 | 7/2013 | Holmberg | |
| 2014/0082913 A1* | 3/2014 | Marcouiller et al. | 29/426.1 |
| 2014/0286608 A1 | 9/2014 | Kahle et al. | |
| 2015/0013889 A1 | 1/2015 | Nelson | |

FOREIGN PATENT DOCUMENTS

| | | |
|---|---|---|
| CA | 2403634 | 9/2002 |
| CN | 2426610 | 4/2001 |
| EP | 0 597 501 | 5/1994 |
| EP | 0 689 069 | 12/1995 |
| EP | 0 731 369 | 9/1996 |
| EP | 0 743 701 | 11/1996 |
| EP | 0 762 558 | 3/1997 |
| EP | 0 788 002 | 8/1997 |
| EP | 0 871 047 | 10/1998 |
| EP | 0 967 498 | 12/1999 |
| EP | 0 975 180 | 1/2000 |
| EP | 1 045 267 | 10/2000 |
| EP | 1 443 350 | 8/2004 |
| EP | 1 486 808 | 12/2004 |
| JP | 63-229409 | 9/1988 |
| JP | 2000-266963 | 9/2000 |
| JP | 2001-33658 | 2/2001 |
| JP | 2001-188134 | 7/2001 |
| JP | 1-144266 | 6/2002 |
| JP | 3307618 | 7/2002 |
| JP | 2005-345589 | 12/2005 |
| JP | 3761762 | 3/2006 |
| JP | 2010-230862 | 10/2010 |
| WO | WO 95/35520 | 12/1995 |
| WO | WO 98/53347 | 11/1998 |
| WO | WO 99/27404 | 6/1999 |
| WO | WO 00/75706 | 12/2000 |
| WO | WO 01/79904 | 10/2001 |
| WO | WO 02/21182 | 3/2002 |
| WO | WO 02/103429 | 12/2002 |
| WO | WO 03/093883 | 11/2003 |
| WO | WO 2004/032532 | 4/2004 |
| WO | WO 2005/101076 | 10/2005 |

OTHER PUBLICATIONS 24 photos of LambdaUnite® Blank Card; "LambdaUnite® MultiService Switch (MSS)" brochure (2003); and "Lucent's LambdaUnite® Busts Out" official release, dated Jan. 29, 2002 (33 pages total).

ADC Telecommunications, Inc., brochure entitled "Value-Added Module System," Publication No. 891, 29 pages, dated Apr. 2000.

ADC Telecommunications, Inc., brochure entitled "Value-Added Module System: Optical Distribution Frame (OMX™ 600)," Publication No. 891-OMX, 11 pages, dated Jan. 2002.

ADC Telecommunications, Inc., brochure entitled "Fiber Panel Products, Second Edition," Publication No. 846, 116 pages, dated Jul. 1996.

ADC Telecommunications, Inc., brochure entitled "Secure Fiber Entrance Terminal (SFET)," Publication No. 1005, 8 pages, dated May 1998.

ADC Telecommunications, Inc. brochure entitled "Next Generation Frame (NGF) Product Family Ordering Guide, 6$^{th}$ Edition," Publication No. 820, 44 pages, dated Feb. 2003.

ADC Telecommunications, Inc. brochure entitled "Fiber Optic, Cable Assemblies and Accessories," Publication No. 100300, 26 pages, dated Apr. 2003.

ADC Telecommunications, Inc. brochure entitled "OMX™ 600 Optical Distribution Frame," Publication No. 854, front cover, table of contents, pp. 1-13, rear cover, dated Apr. 2000 (15 pages total).

ADC Telecommunications, Inc., brochure entitled "Outside Plant, Fiber Cross-Connect Solutions," Publication No. 1047, 51 pages, dated Jun. 2002.

AMP Inc. catalog entitled "Fiber Optic Products," front and back covers and p. 59, (Copyright 1991) (4 pages total).

AT&T Network Systems catalog entitled "Fiber Optic Products Innovation for wide ranging applications," front and back covers and pp. 6-1 through 6-16 (Copyright 1995) (18 pages total).

ATI Optique Division of TI electronique, "ATI Optique Catalog," Version 2.6, released Mar. 27, 2002 (50 pages).

Amphenol Corp., brochure entitled "Amphenol® 954 Series one piece SC Connector," F122-00311, Issue 1, 2 pages, dated Aug. 1990.

Alcoa Fujikura Ltd. brochure entitled "Couplers: Couplers WDMS Packaging,", 5 pages (Copyright 2000).

Drawings showing an ADC fiber storage trough concept including presentation entitled "Fujitsu Fiber Management Project Fiber Trough Concept," 11 pages (Jun. 2002).

Drawings showing another ADC fiber storage trough concept including presentation entitled "Fujitsu Fiber Management Project Fiber Trough Concept" by Kathy Barnes (7 pages), photos of trough disclosed in presentation by Kathy Barnes installed in a rack (3 pages) and presentation entitled "Fujitsu Fiber Management Project Fiber Trough Concept" by Dan Mertesdorf (9 pages), 19 total pages (Apr. 2002).

FONS Corporation product sheet entitled "Modular Distribution Cabinets Rack Mount Enclosures," 2 pages (Copyright 2005).

Hirose Electric Co., Ltd. catalog entitled "Optical Fibre Connectors," Catalog No. O.F. (9) 3K, front and back covers and pp. 16, 17, and 49, dated Mar. 1991 (5 pages total).

Iwano et al., "MU-type Optical Fiber Connector System," *NTT Review*, vol. 9, No. 2, pp. 63-71 (Mar. 1997).

Nexans, "Cross-Connect Cabinet III: Plastic Watertight Cabinet for FTTH Applications," 2 pages (Oct. 2002).

(56) References Cited

OTHER PUBLICATIONS

Nexans, "Cross-Connect Cabinet V: Metallic Watertight Cabinet for FTTH Applications," 2 pages (Oct. 2002).

"Optical fiber coupler review," Manufacturing Group at the Optoelectronics Division, Technical Report 2001, Products Presentation, showing Sumitomo Osaka Cement Co. Ltd's Optical Coupler (pp. 41-42).

Sugita et al., "SC-Type Single-Mode Optical Fiber Connectors," *Journal of Lightwave Technology*, vol. 7, No. 11, pp. 1689-1696 (Nov. 1989).

* cited by examiner

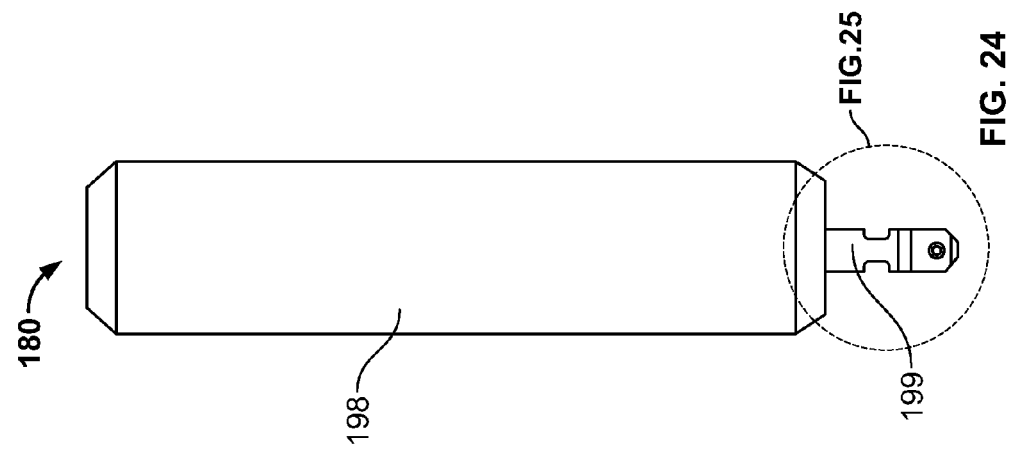
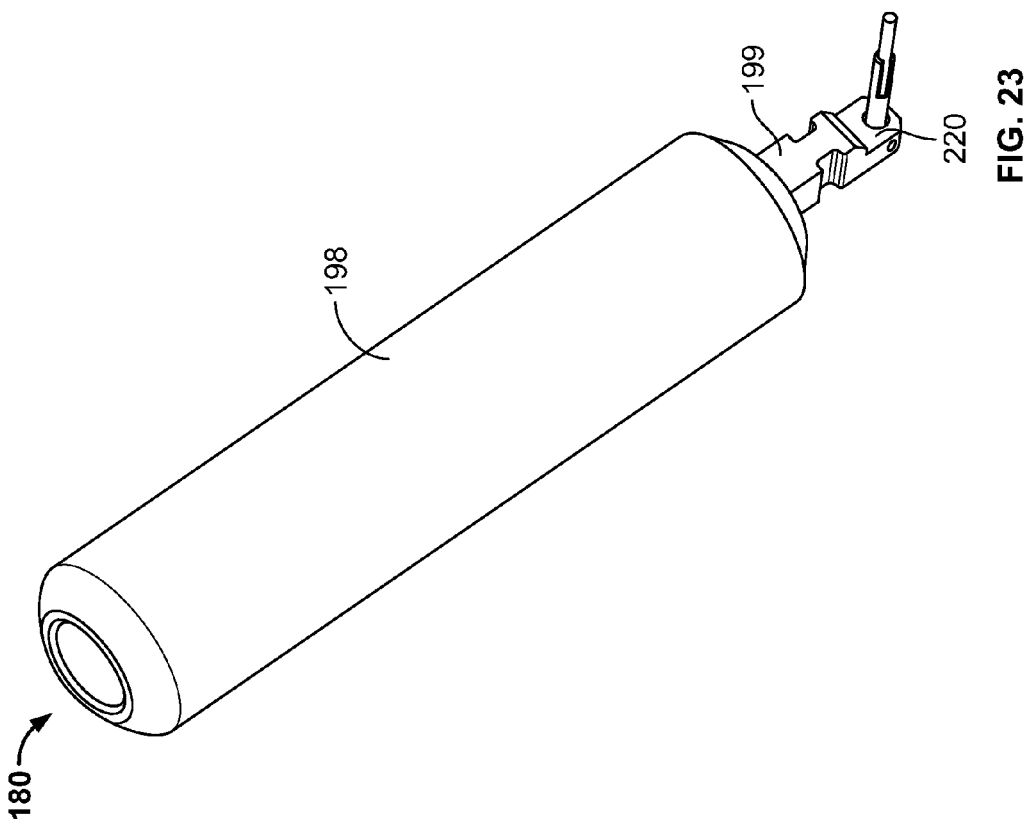

INSERTION AND REMOVAL TOOL FOR A FIBER OPTIC FERRULE ALIGNMENT SLEEVE

CROSS REFERENCE TO RELATED APPLICATIONS

This application claims the benefit of U.S. Provisional Application No. 61/770,178, filed on Feb. 27, 2013, and U.S. Provisional Application No. 61/704,271, filed on Sep. 21, 2012, the disclosures of which are hereby incorporated herein by reference.

FIELD

The present disclosure relates generally to fiber optic telecommunications devices. In particular, the present disclosure relates to tools used for inserting and removing ferrule alignment sleeves from fiber optic adapters.

BACKGROUND

Fiber optics have revolutionized communication throughout the world. Fiber optics are generally thin strings of glass designed to carry light which can be grouped together. With the increased use of fiber optics, it has become increasingly important to be able to connect and disconnect fiber optic cables from various sources. Two fiber optic cables can be optically coupled so that they are in communication with one another by using well-known connectors and adapters, thereby putting each fiber optic cable in communication with the other. The connectors are terminated to the end of each cable and then plugged into the adapters. The adapters normally include an opening at each end designed to receive the connectors. An example adapter for holding two LC-type mating connectors is described in U.S. Pat. No. 5,647,043.

SUMMARY

The present disclosure relates generally to a tool used for insertion and/or removal of ferrule alignment sleeves from fiber optic adapters. According to one example embodiment, the tool may be used to insert and/or remove a ferrule alignment sleeve from an LC type adapter.

In one particular aspect, the present disclosure relates to a tool for inserting a ferrule alignment sleeve within a sleeve mount of a fiber optic adapter, wherein the sleeve mount defines an axial bore and radially inwardly extending fingers for retaining the ferrule alignment sleeve therewithin. The tool includes a handle and a pin extending from the handle, the pin configured to slidably receive the ferrule alignment sleeve, the pin defining longitudinal keys for mating with gaps defined between the radially inwardly extending fingers of the sleeve mount, wherein the tool can be used as a ferrule alignment sleeve insertion tool if the pin is inserted into the axial bore in a first orientation and is configured to be used as a ferrule alignment sleeve removal tool if the pin is inserted into the axial bore in a second orientation from an opposite end of the axial bore.

According to another aspect, the present disclosure relates to a tool for removing a ferrule alignment sleeve from a sleeve mount of a fiber optic adapter, the sleeve mount defining an axial bore and radially inwardly extending fingers for retaining the ferrule alignment sleeve therewithin, the tool comprising a handle and a pin extending from the handle, the pin defining longitudinal keys for mating with gaps defined between the radially inwardly extending fingers of the sleeve mount, the longitudinal keys sized to push the ferrule alignment sleeve out of the sleeve mount of the fiber optic adapter.

According to another aspect, the present disclosure relates to a method of inserting a ferrule alignment sleeve within a sleeve mount of a fiber optic adapter, the sleeve mount defining an axial bore and radially inwardly extending fingers for retaining the ferrule alignment sleeve therewithin, the method comprising placing a ferrule alignment sleeve on a pin, the pin defining longitudinal keys for mating with gaps defined between the radially inwardly extending fingers of the sleeve mount, and inserting the pin with the ferrule alignment sleeve into the axial bore of the sleeve mount.

According to yet another aspect, the present disclosure relates to a method of removing a ferrule alignment sleeve from a sleeve mount of a fiber optic adapter, the sleeve mount defining an axial bore and radially inwardly extending fingers for retaining the ferrule alignment sleeve therewithin, the method comprising inserting a pin into the axial bore of the sleeve mount from a first end, the pin defining longitudinal keys for mating with gaps defined between the radially inwardly extending fingers of the sleeve mount, and pushing the ferrule alignment sleeve out of the sleeve mount from a second opposite end with the pin.

According to yet another aspect, the present disclosure relates to a kit for removing a ferrule alignment sleeve from a sleeve mount of a fiber optic adapter, the kit including a tool for removing the sleeve and a sleeve catcher configured to be coupled to an opposite end of the fiber optic adapter from the tool for catching the removed sleeve. According to one example embodiment, the sleeve catcher is configured to have the shape of a standard fiber optic connector (e.g., an LC connector) that is not terminated to any cabling. The sleeve catcher that is shaped, for example, as an LC type fiber optic connector can mount to the opposite end of the adapter with a standard snap-fit lock as known for LC connectors.

A variety of additional inventive aspects will be set forth in the description that follows. The inventive aspects can relate to individual features and combinations of features. It is to be understood that both the foregoing general description and the following detailed description are exemplary and explanatory only and are not restrictive of the broad inventive concepts upon which the embodiments disclosed herein are based.

BRIEF DESCRIPTION OF THE DRAWINGS

FIG. 23 illustrates a perspective view of the sleeve insertion tool of FIG. 22 in isolation;

FIG. 24 is a front view of the sleeve insertion tool of FIG. 23;

DETAILED DESCRIPTION

Figure 1:
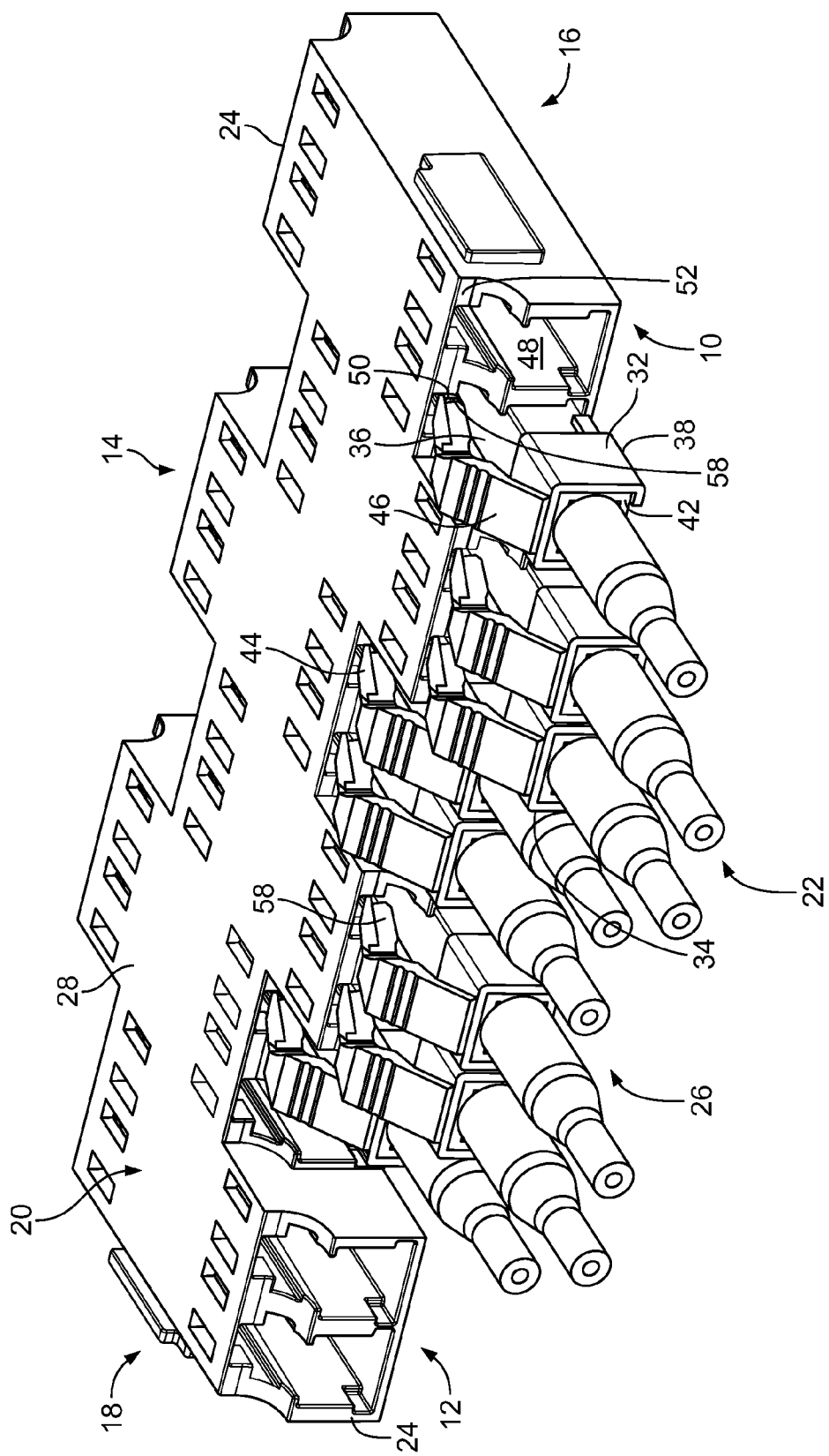
FIG. 1 is a perspective view of a fiber optic adapter block with a number of fiber optic connectors mounted thereon.

Reference will now be made in detail to examples of inventive aspects of the present disclosure which are illustrated in the accompanying drawings. Wherever possible, the same reference numbers will be used throughout the drawings to refer to the same or like parts.

Referring to FIGS. 1-4, a fiber optic adapter block 10 having features that are examples of inventive aspects in accordance with the present disclosure is illustrated. The fiber optic adapter block 10 defines a front end 12, a rear end 14, a right side 16, a left side 18, a top side 20, and a bottom side 22. In the depicted embodiment, the fiber optic adapter block 10 defines a plurality of fiber optic adapters 24 having an LC footprint that are configured to optically connect a pair of LC style fiber optic connectors 26. In the depicted embodiment, the adapter block 10 defines a generally one-piece unitary molded body 28, wherein the plurality of adapters 24 are integrally formed with the one-piece body 28. According to one example embodiment, the body 28 and the integrally formed adapters 24 may be molded from a polymeric material. In the depicted embodiment, the block 10 defines six LC-type duplex adapters 24 extending widthwise from the right side 16 to the left side 18 of the body 28 for a total of twelve possible connections.

In the depicted embodiment, the adapter block 10 is molded such that every other duplex adapter 24 is staggered in a front-to-back direction with respect to an adjacent adapter as the adapters 24 extend from the right side 16 to the left side 18 of the block 10. The staggering alternates from the right side to the left side.

Referring specifically to FIG. 1, the fiber optic adapter block 10 is illustrated with a number of LC-type fiber optic connectors 26 inserted within the individual adapters 24 of the block 10. LC-type connectors 26 and adapters 24 are generally known in the art. A fiber optic connector 26 having an LC footprint may define a connector housing 30 having opposing sidewalls 32, 34, a top wall 36, a bottom wall 38, a front end 40, and a rear end 42. Certain portions of the connector housing 30 may be formed from a molded polymeric material. The connector housing 30 normally defines a latch 44 extending from the top wall 36 thereof toward the rear end 42, the latch 44 extending at an acute angle with respect to the top wall 36 of the connector housing 30. An LC-type connector 26 may also include a latch trigger 46 that extends from the rear end 42 of the connector housing 30 toward the front end 40. The latch trigger 46 also normally extends at an acute angle with respect to the top wall 36. The latch trigger 46 is configured to come into contact with the latch 44 for flexibly moving the latch 44 downwardly.

When an LC-type fiber optic connector 26 is placed in an adapter 24 for optically coupling light from two optical fibers together, the latch 44 functions to lock the fiber optic connector 26 in place within a port 48 of the adapter 24. As is known in the art, the latch 44 normally includes a pair of catches 50, each one extending from a side of the latch 44. Within each adapter port 48 is a pair of symmetrically disposed retaining shoulders 52. The shoulders 52 are configured to interact with the catches 50 of the latch 44 to deflect the latch 44 downwardly (i.e., toward the central axis of the connector 26). Once inserted therein, the shoulders 52 are configured to interact with a vertical surface 58 of a catch 50 to lock the fiber optic connector 26 within the adapter 24.

During insertion, the interaction between the catches 50 of the latch 44 and the shoulders 52 cause the latch 44 to move downwardly. The latch 44 springs back (upwardly) after insertion is complete. Thereafter, the shoulders 52 interact with the vertical surfaces 58 on the catches 50 of the latch 44 to lock the connector 26 into the adapter 24.

Removal of the connector 26 is normally accomplished by manually depressing the latch 44 downwardly and pulling the connector 26 away from the adapter port 48. As noted above, the latch trigger 46 may be used to provide greater access to the latch 44 and may be configured to come into contact with the latch 44 for flexibly moving the latch 44 downwardly. When the latch trigger 46 is depressed, the interaction between the latch trigger 46 and the latch 44 causes the latch 44 to be pressed in a downward direction, freeing the catch portions 50 of the latch 44 from the shoulders 52 in removing the connector 26.

Further details relating to LC-type adapters are described in U.S. Pat. No. 5,647,043, the entire disclosure of which is incorporated herein by reference.

As known, LC-type fiber optic adapters 24 may be provided as duplex adapters wherein each duplex adapter defines a pair of adapter ports 48 positioned next to one another. Duplex clips may be provided on the connectors 26 for coupling two LC connectors 26 in a side-by-side configuration. A duplex clip may include a single larger latch trigger that expands over the individual latch triggers 46 of the connectors 26 for removing the two connectors 26 at the same time from a duplex LC adapter 24. An example of a duplex clip is shown and described in U.S. Pat. No. 6,672,898, the entire disclosure of which is incorporated herein by reference.

As is known for LC-type fiber optic connectors 26, each connector 26 may define a ferrule assembly including a ferrule, a hub, and a spring mounted therein. The ferrule hub and the spring are normally captured within a front housing portion of the connector housing 30 by a rear housing portion or insert of the connector housing 30. In certain embodiments of LC connectors 26, the front housing portion may define openings or slots that are configured to receive ribs or tabs formed adjacent a front end of the rear housing portion for snap-fitting the two housing portions together.

Figure 2:
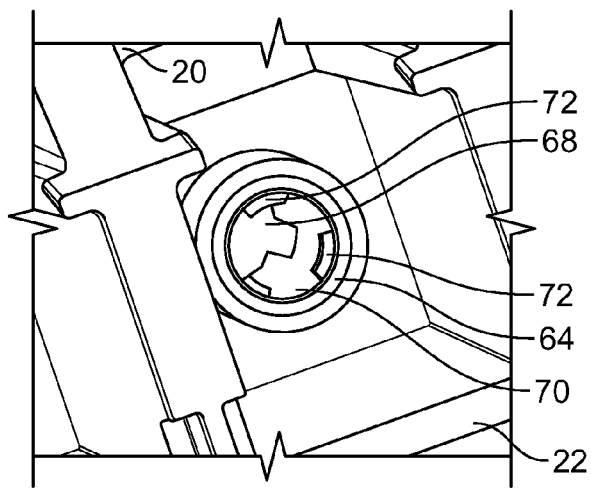
FIG. 2 is a close-up view of a front port of one of the adapters of the block of FIG. 1 illustrating ferrule alignment sleeve retention features of the front port.
Figure 3:
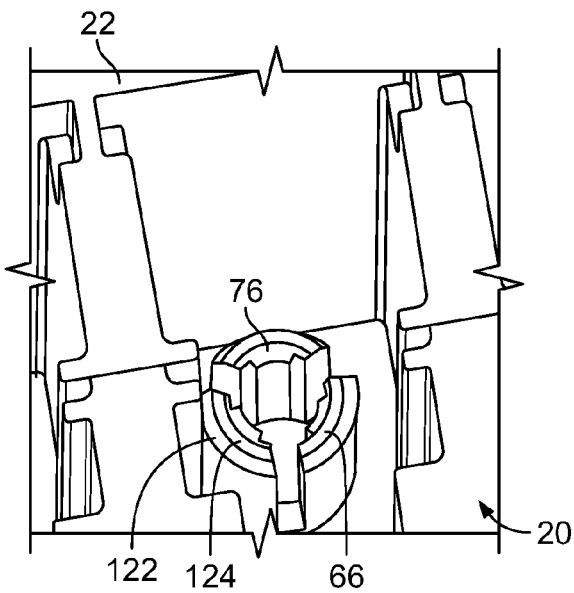
FIG. 3 is a close-up view of a rear port of one of the adapters of the block of FIG. 1 illustrating ferrule alignment sleeve retention features of the rear port.
Figure 4:
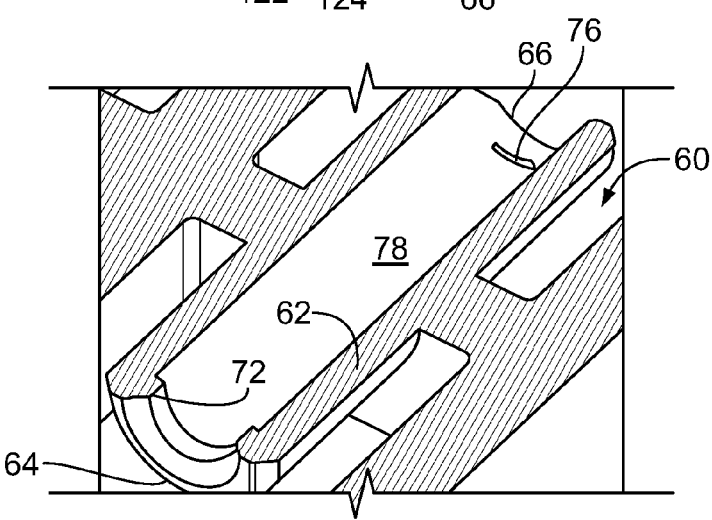
FIG. 4 is a cross-sectional view bisecting one of the adapters of the block of FIG. 1, illustrating sleeve retention features of the adapter at both the front and rear ports.

In optically aligning two LC type connectors 26 via an LC adapter 24, the ferrules of opposing connectors 26 are normally aligned using a ferrule alignment sleeve that is found within an internal ferrule alignment structure 60 of the adapter. As shown in FIGS. 2-4, the internal ferrule alignment structure 60 is exposed at both ends to both ports 48 of the adapter 24. The internal ferrule alignment structure 60 includes a sleeve mount 62 and a ferrule sleeve 63 (not shown in FIGS. 2-4, but shown removed from the sleeve mount 62 in FIG. 36) that is designed to be inserted within the sleeve mount 62. As shown in FIGS. 2-4, the sleeve mount 62 may be molded integrally with the adapter body 28 and is configured to align the ferrules of two LC-type fiber optic connectors 26 received from opposing ends of the adapter 24.

Still referring to FIGS. 2-4, the sleeve mount 62 defines a first end 64, a second end 66, and an axial bore 68 extending therebetween. The first end 64 may be referred to herein as the front end and the second end 66 may be referred to herein as the rear end of the sleeve mount 62. At the first end 64, the sleeve mount 62 defines a generally circular opening 70 with a plurality of inwardly extending fingers 72 disposed radially therearound. The second end 66 of the sleeve mount 62 is defined by a plurality flexible arms 74 around the axial bore 68. As will be discussed in further detail below, the flexible arms 74 are configured to flex out radially to receive the sleeve with a snap-fit arrangement. The flexible arms 74 also include inwardly extending fingers 76 for capturing the sleeve within the axial bore 68 once the sleeve is received therein. Once inserted, the sleeve is stopped from advancing further by the inwardly extending fingers 72 of the first end 64. When the sleeve is fully seated in the sleeve mount 62, the sleeve is captured by the inwardly extending fingers 72, 76 at both ends of the sleeve mount 62 and is positioned within a sleeve retention region 78 of the sleeve mount 62.

In embodiments of LC adapters 24, wherein both ends of the sleeve mount 62 define flexible arms, the sleeve 63 can be inserted into the axial bore 68 from either end of the sleeve mount 62. However, in the depicted embodiment, the sleeve mount 62 is configured to receive the sleeve 63 from the rear end 66 with the flexible arms 74 flexing out in receiving the sleeve 63. The sleeve 63 may also include a slit for allowing the sleeve 63 to compress, elastically reducing its diameter to facilitate insertion.

It should be noted that in the depicted embodiment, the inwardly extending fingers 76 defined by the flexible arms 74 located at the second end 66 of the sleeve mount 62 are positioned at a circumferentially offset relationship with respect to the inwardly extending fingers 72 located at the first solid circular end 64 of the sleeve mount 62. In this manner, the inwardly extending fingers 72, 76 may be molded with molds that are pulled apart axially from the ends of the fiber optic adapter 24 in the longitudinal direction.

As shown in FIGS. 2 and 3, the top side of the adapter block is referenced by numeral 20 and the bottom side is referenced by numeral 22. As shown in FIG. 2, at the front end 64 of the sleeve mount 62, one of the fingers 72 is located toward the top side 20. As shown in FIG. 3, the fingers 76 at the rear end 66 are oriented to be circumferentially offset from the fingers 72 at the front end 64, and, at the rear end 66, there is a finger 76 that is toward the bottom side 22 of the adapter block 10.

Figure 5:
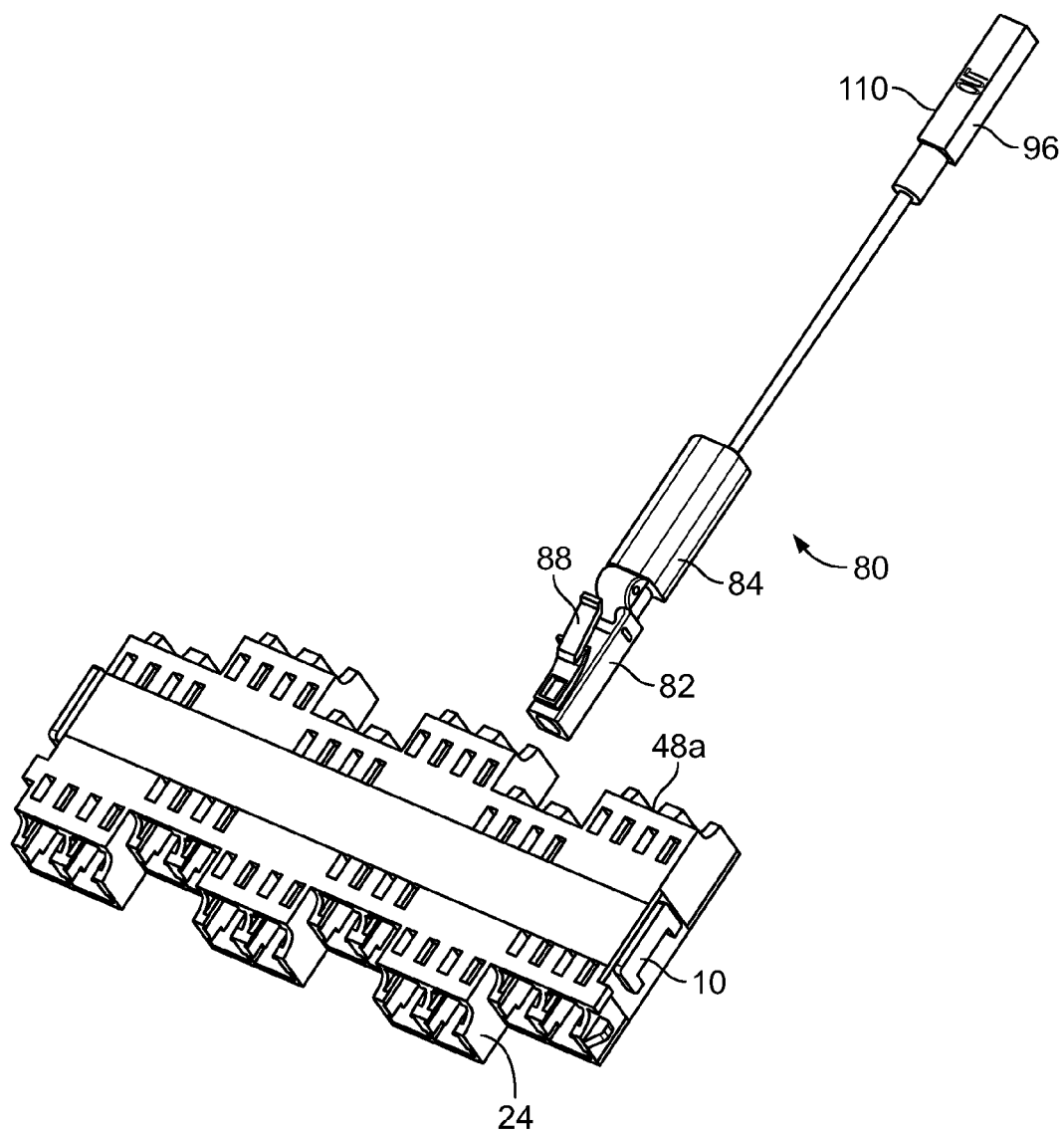
FIG. 5 illustrates a ferrule alignment sleeve insertion/removal tool being used on a fiber adapter block similar to that shown in FIG. 1, the tool having features that are examples of inventive aspects in accordance with the principles of the present disclosure, the tool being used for removing the alignment sleeve.
Figure 6:
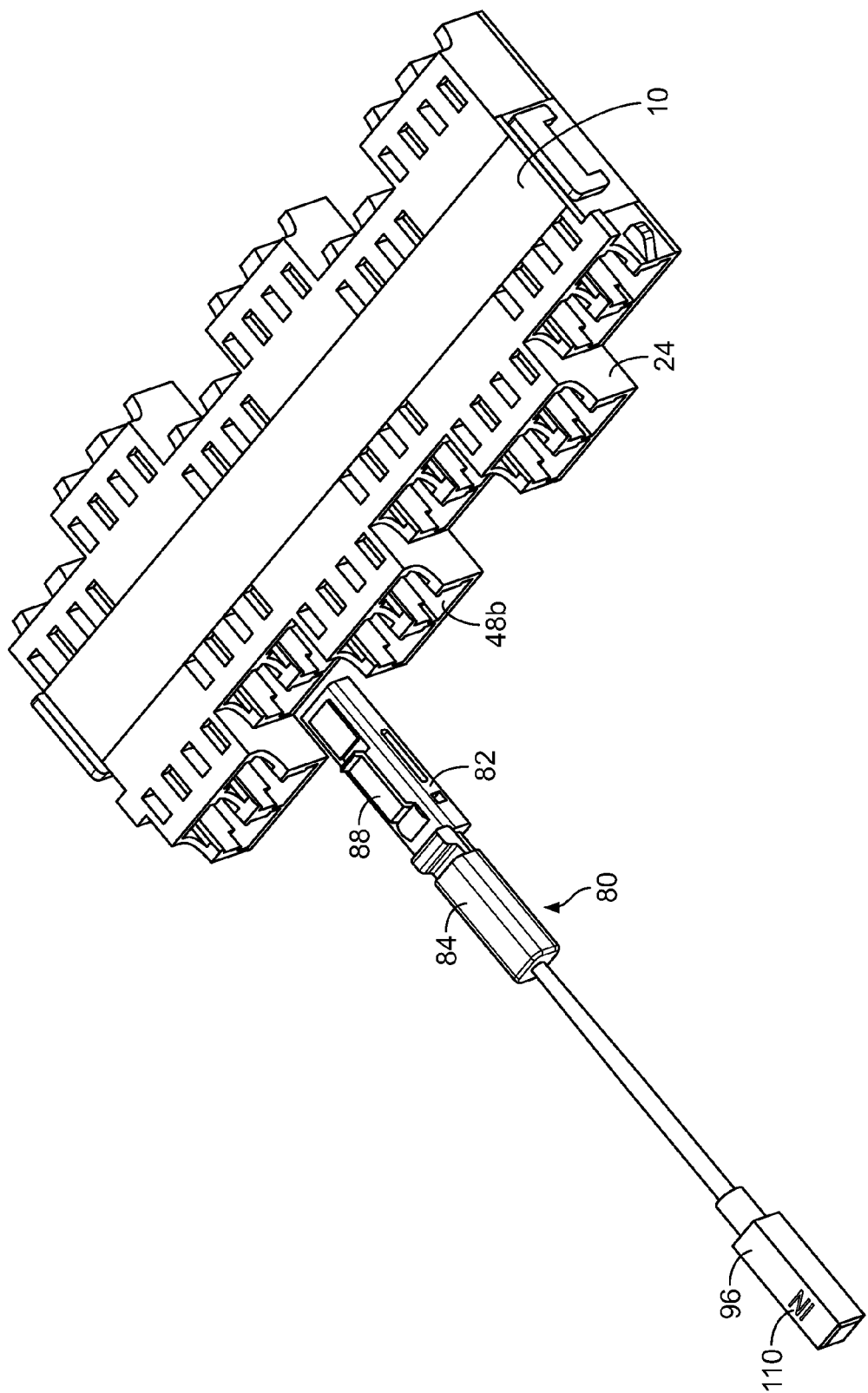
FIG. 6 illustrates the ferrule alignment sleeve insertion/removal tool being used with the adapter block of FIG. 5 in inserting the ferrule alignment sleeve within the adapter.
Figure 6A:
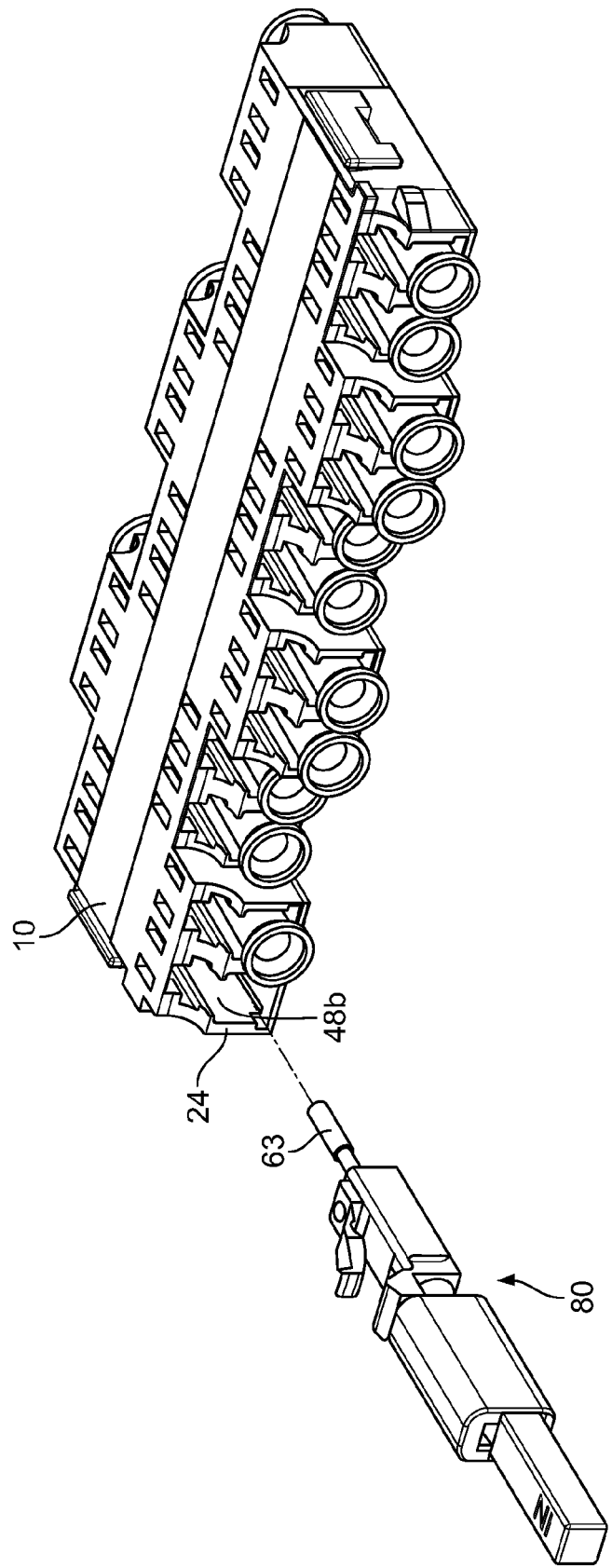
FIG. 6A illustrates a ferrule alignment sleeve placed on the tool when the tool is being used as an insertion tool.
Figure 7:
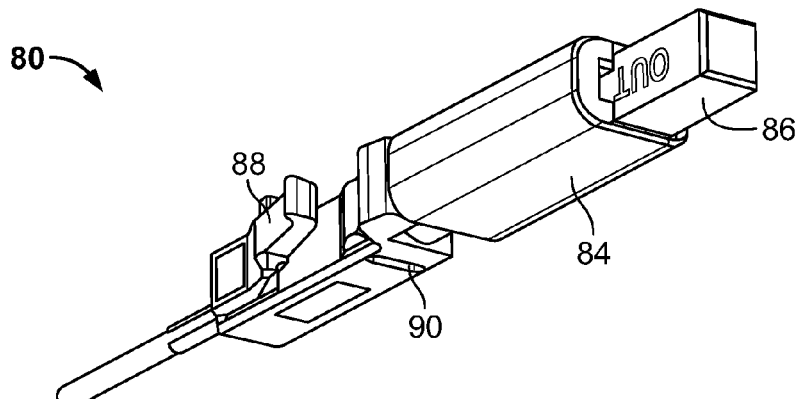
FIG. 7 is a perspective view of the ferrule alignment sleeve insertion/removal tool of FIGS. 5-6 assembled in a sleeve removal configuration.
Figure 8:
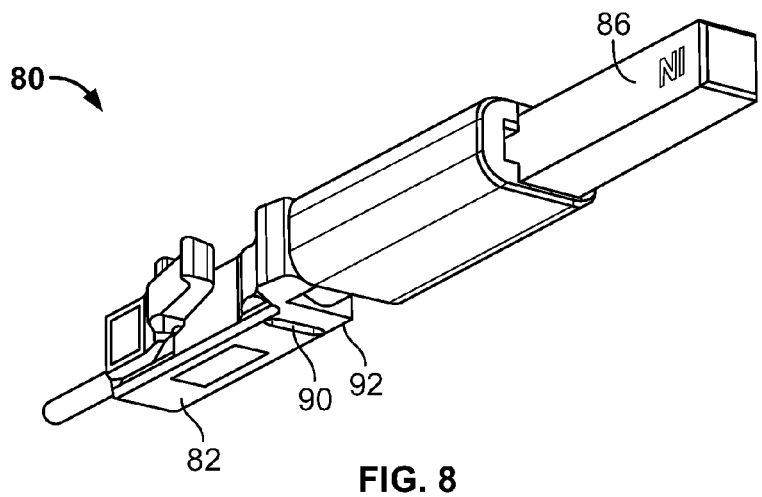
FIG. 8 is a perspective view of the ferrule alignment sleeve insertion/removal tool of FIGS. 5-6 assembled in a sleeve insertion configuration.
Figure 9:
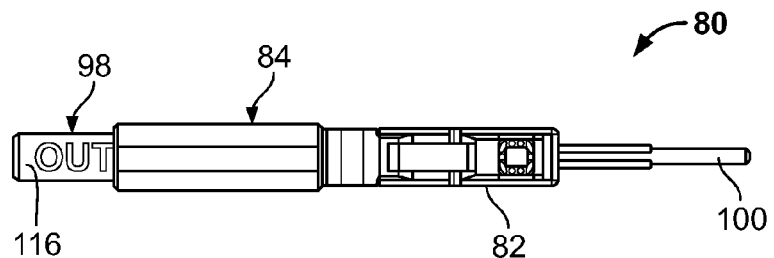
FIG. 9 is a top view of the ferrule alignment sleeve insertion/removal tool of FIGS. 5-6 assembled in a sleeve removal configuration.
Figure 10:
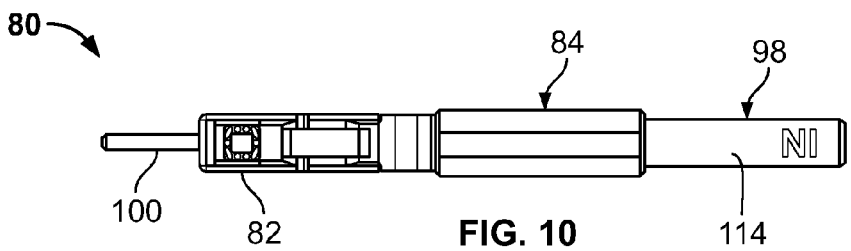
FIG. 10 is a top view of the ferrule alignment sleeve insertion/removal tool of FIGS. 5-6 assembled in a sleeve insertion configuration.
Figure 13:
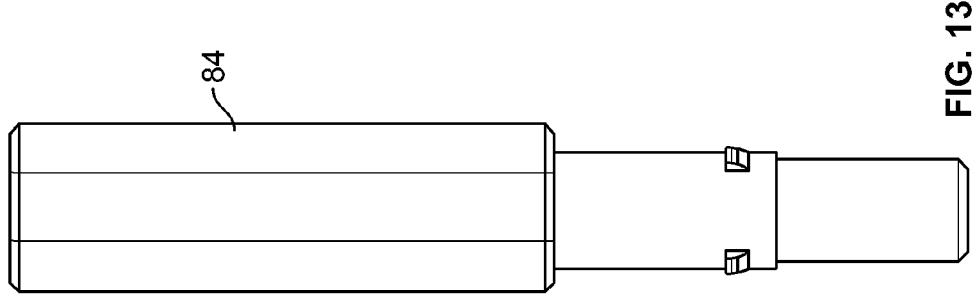
FIG. 13 is a top view of the plunger housing of FIG. 11.
Figure 12:
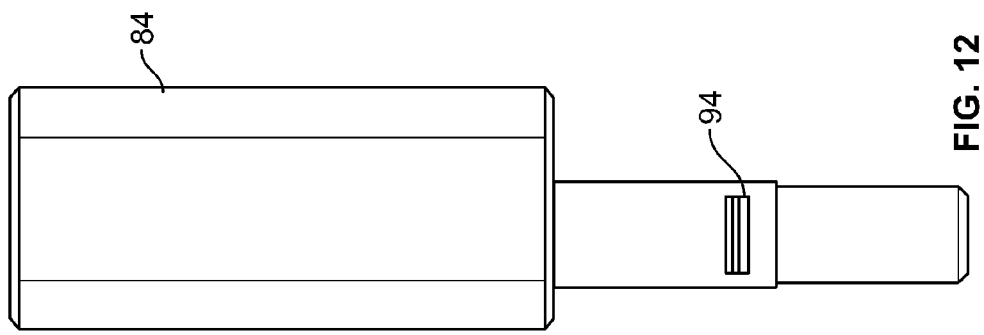
FIG. 12 is a side view of the plunger housing of FIG. 11.
Figure 11:
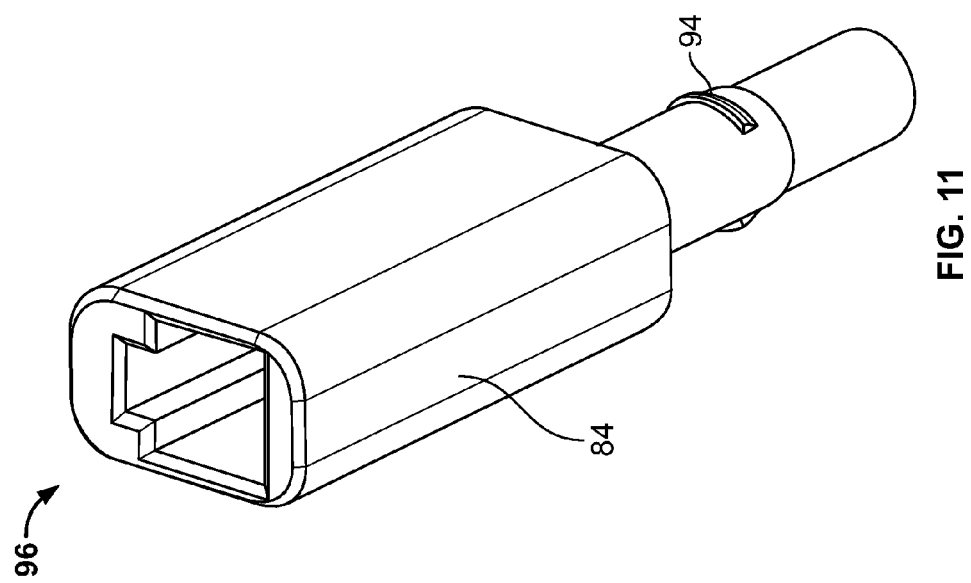
FIG. 11 is a perspective view of the plunger housing of the ferrule alignment sleeve insertion/removal tool of FIGS. 5-6.
Figure 14:
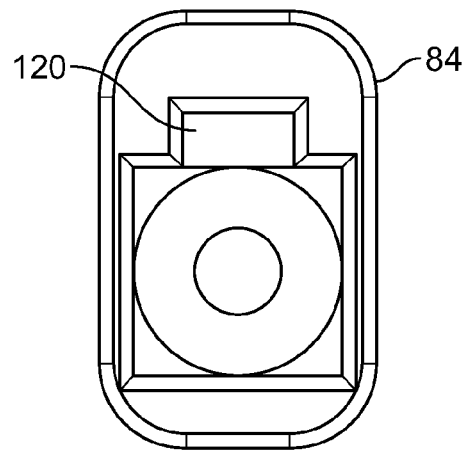
FIG. 14 is a rear view of the plunger housing of FIG. 11.
Figure 15:
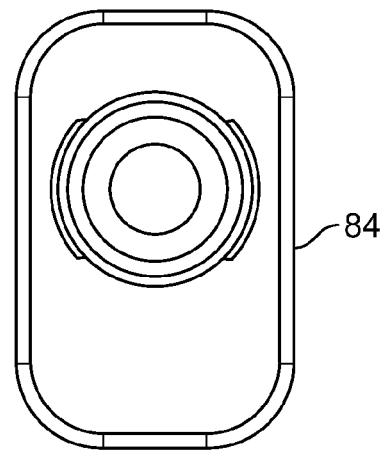
FIG. 15 is a front view of the plunger housing of FIG. 11.
Figure 16:
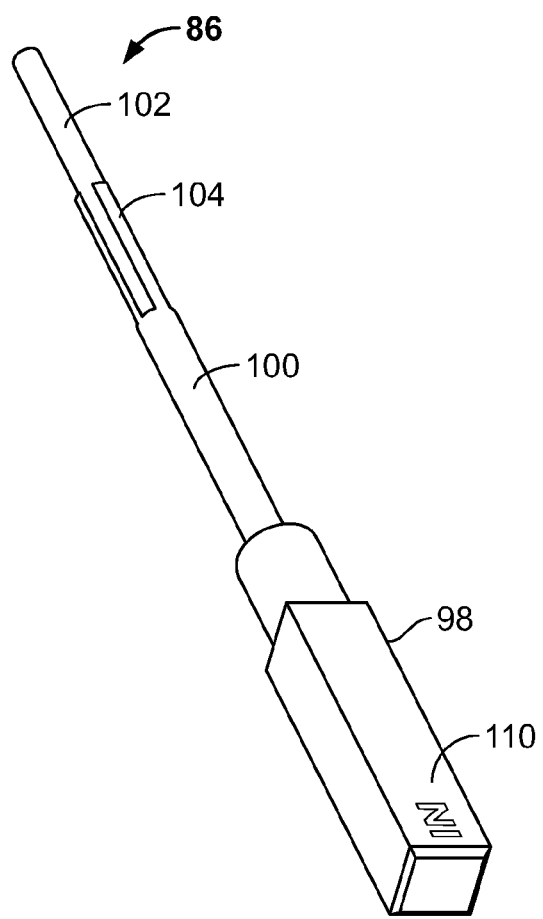
FIG. 16 is a perspective view of the plunger of the ferrule alignment sleeve insertion/removal tool of FIGS. 5-6.

Referring now to FIGS. 5-21, a ferrule alignment sleeve insertion/removal tool 80 having features that are examples of inventive aspects in accordance with the principles of the present disclosure is shown. The tool 80 can be used for both insertion and removal of the ferrule alignment sleeve 63 into and out of a sleeve mount 62 that is configured similar to that shown in FIGS. 2-4. As will be discussed in further detail below, in FIG. 5, the tool 80 is being used for removing the alignment sleeve 63 from an adapter 24 by being inserted into the front port 48a of the adapter. In FIGS. 6 and 6A, the tool 80 is being used for placing the alignment sleeve into a sleeve mount 62 of an adapter 24 by being inserted into the rear port 48b of the adapter 24. In FIG. 6A, specifically, the sleeve 63 is shown as placed on the tool 80, ready for insertion through the rear port 48b of the adapter 24.

Still referring to FIGS. 5-21, the tool 80 includes a coupling housing 82, a plunger housing 84, and a plunger 86. As will be discussed in further detail, the plunger housing 84 is configured to be fixedly connected to the coupling housing 82 and the plunger 86 is configured to slidably telescope within the plunger housing 84 in operating the tool 80.

Figure 21:
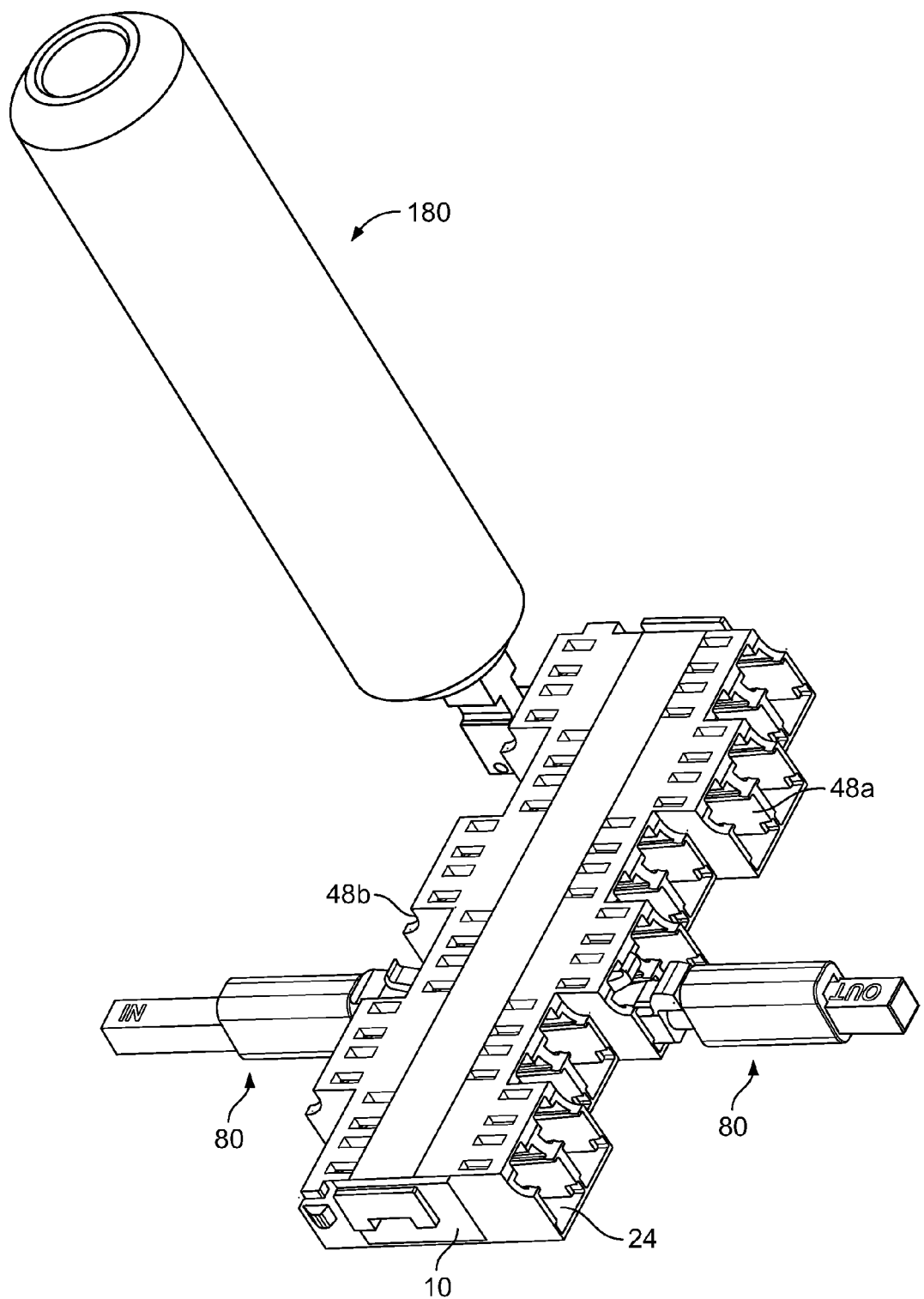
FIG. 21 illustrates two of the ferrule alignment sleeve insertion/removal tools mounted to an adapter block, one of the tools mounted in a sleeve insertion orientation and one mounted in a sleeve removal orientation, the adapter block further shown with another embodiment of a ferrule alignment sleeve insertion tool having features that are examples of inventive aspects in accordance with the principles of the present disclosure.
Figure 22:
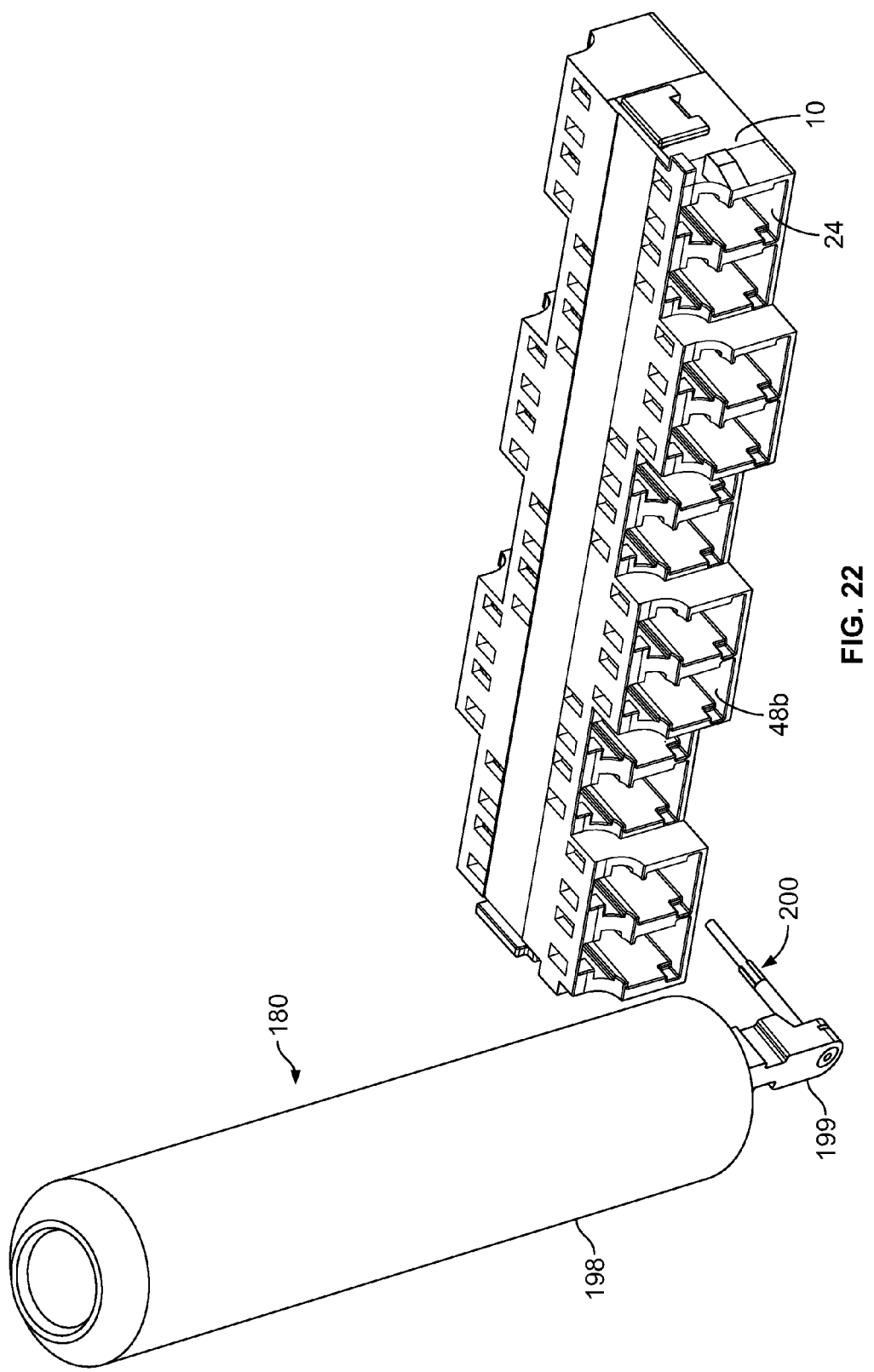
FIG. 22 illustrates the ferrule alignment sleeve insertion tool of FIG. 21 being used on the fiber adapter block.
Figure 27:
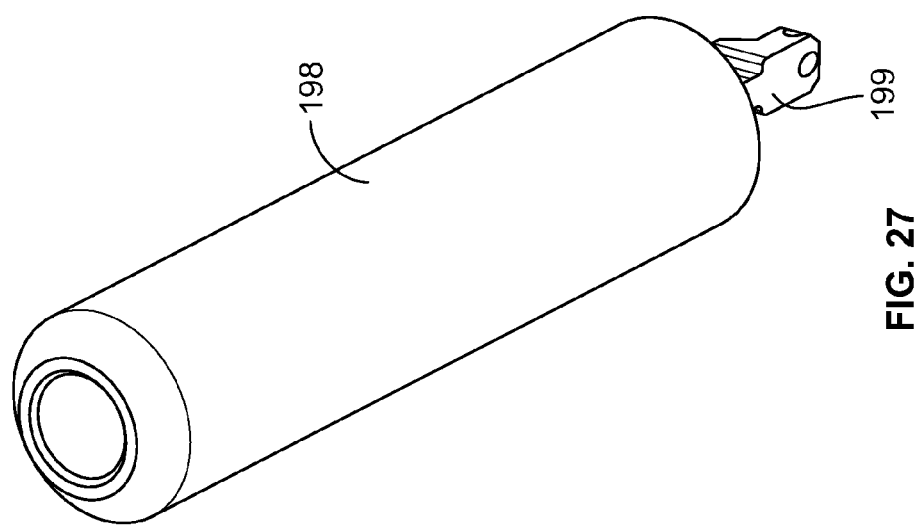
FIG. 27 is a rear perspective view of the handle and the pin mount portion of the tool of FIG. 23.
Figure 26:
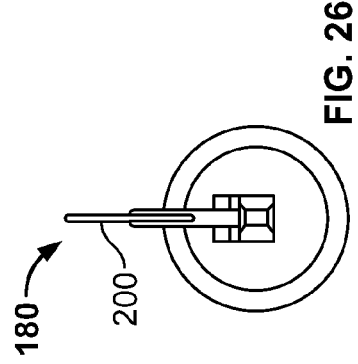
FIG. 26 is a bottom view of the sleeve insertion tool of FIG. 23.
Figure 25:
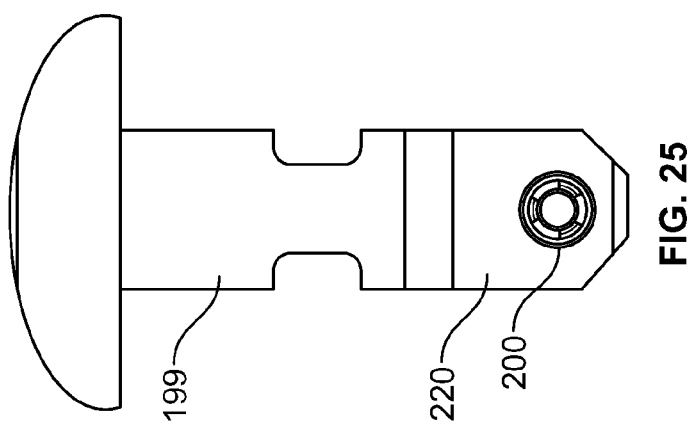
FIG. 25 is a close up view of a portion of the tool illustrated in FIG. 24.
Figure 28:
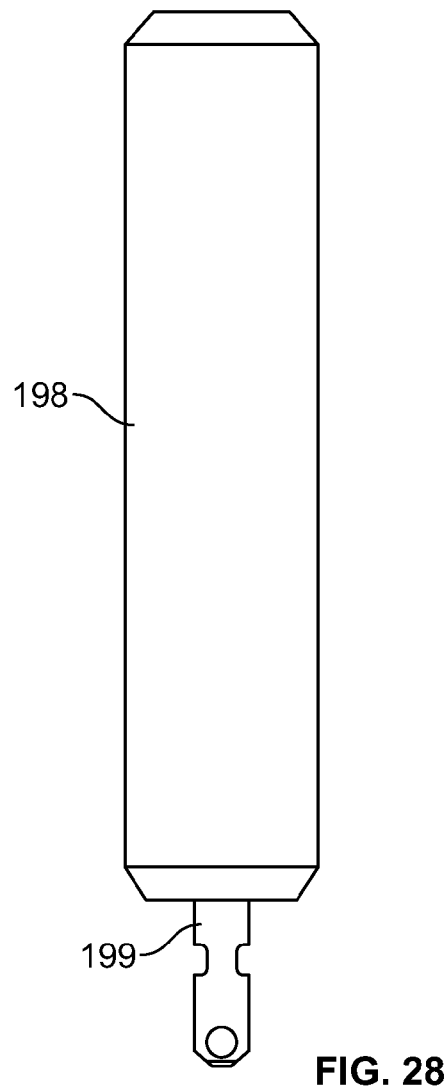
FIG. 28 is a front view of the handle and the pin mount of FIG. 27.
Figure 29:
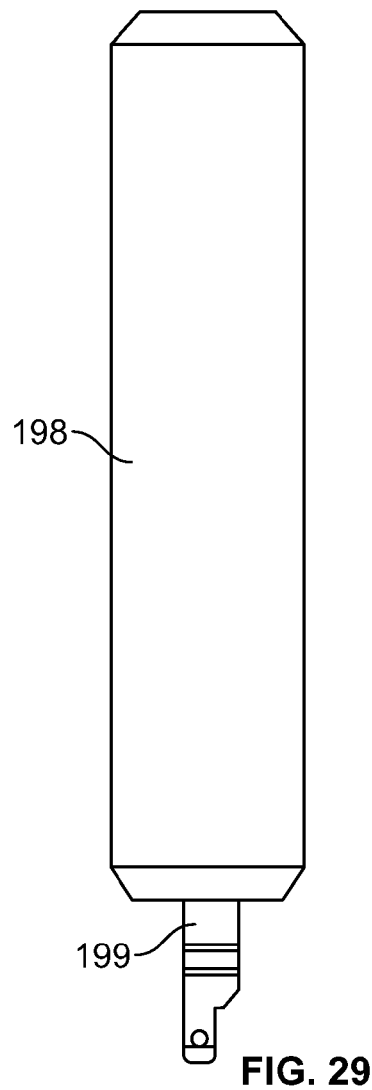
FIG. 29 is a side view of the handle and the pin mount of FIG. 27.
Figure 30:
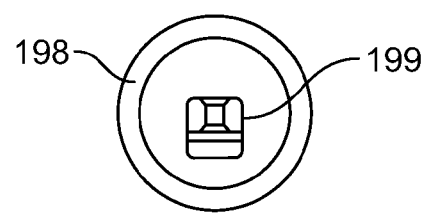
FIG. 30 is a bottom view of the handle and the pin mount of FIG. 27.
Figure 34:
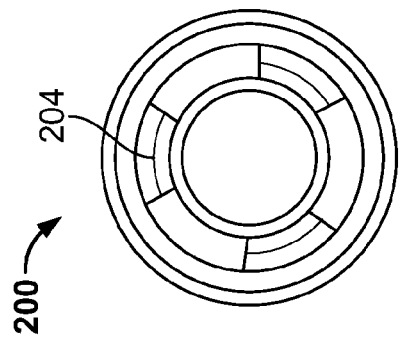
FIG. 34 is a front view of the pin of FIG. 31.
Figure 33:
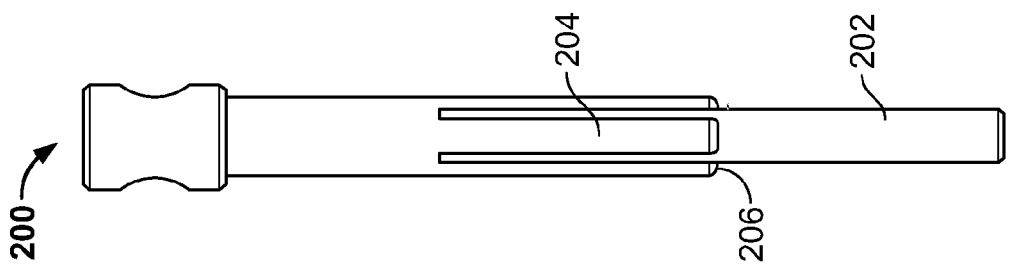
FIG. 33 is a top view of the pin of FIG. 31.
Figure 32:
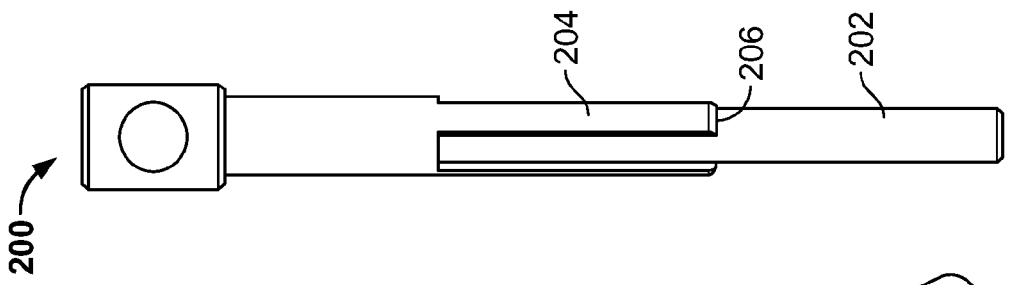
FIG. 32 is a side view of the pin of FIG. 31.
Figure 31:
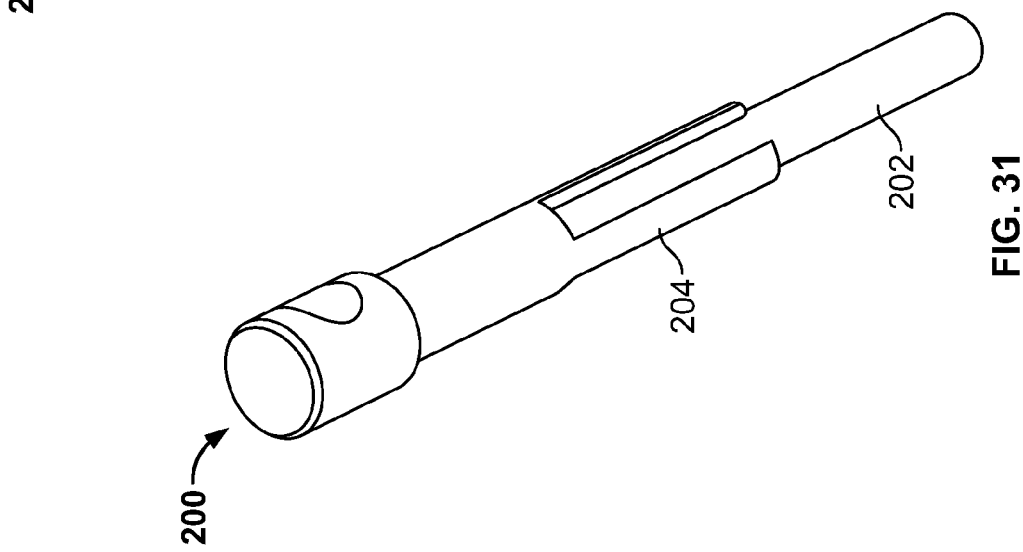
FIG. 31 is a perspective view of the pin portion of the tool of FIG. 23.

The coupling housing 82 has a generally similar configuration to that of a front housing portion of an LC connector housing 30 including a flexible latch 88. The coupling housing 82 is configured to be mounted to a conventional adapter port 48 of an LC-type fiber optic adapter 24 during use of the tool 80. As shown in FIG. 21, the coupling housing 82 of the tool 80 snaps into the adapter ports 48 of a conventional adapter 24 for fixing the tool 80 to the adapter 24. The coupling housing 82 defines slots or openings 90 adjacent the rear end 92 thereof (similar to front housing portions of certain examples of LC connectors 26) for receiving ribs or tabs 94 that are located adjacent the front end 96 of the plunger housing 84. In this manner, a solid connection is established between the plunger housing 84 and the coupling housing 82. The plunger housing 84 is shown in isolation in FIGS. 11-15.

Now referring specifically to FIGS. 16-20, the plunger part 86 of the tool 80 is illustrated in isolation. The plunger 86 defines a rear handle portion 98 and a front pin portion 100. As shown in FIGS. 16-20, the pin portion 100 defines a ferrule alignment sleeve receiving portion 102 at the front of the pin 100 and keying elements 104 (i.e., keys) behind the sleeve receiving portion 102.

The sleeve receiving portion 102 of the pin 100 is generally sized to match the inner diameter of a ferrule alignment sleeve 63 for receiving the sleeve (please see FIG. 6A). The sleeve receiving portion 102 (when there has not been a sleeve placed thereon) is small enough in cross-dimension that it can slide into the axial bore 68 of the sleeve mount 62 of an LC adapter 24 without any interference from the inwardly extending fingers 72, 76. The keys 104 of the pin 100 are sized in radial cross-dimension to be similar to the outer diameter of a ferrule alignment sleeve 63. Thus, when a ferrule alignment sleeve 63 is placed on the sleeve receiving portion 102 of the pin 100, the sleeve abuts against the keys 104 and comes to a stop. The keys 104, thus, define an abutment surface 106 at the front end thereof. As will be explained in further detail, when the pin 100 of the plunger 86 is inserted into axial bore 68 of the sleeve mount 62, the keys 104 are large enough in cross-dimension to be able to push a sleeve 63 that is in the sleeve mount 62 out of the sleeve mount 62.

In the depicted embodiment of the LC adapter 24, since the front end 64 of the sleeve mount 62 defines a fully circular opening 70 with inwardly extending fingers 72 without flexible arms 74, the sleeve must be removed from the rear end 66. Thus, in removing the sleeve, the tool 80 needs to enter the bore 68 from the front end 64 and push the sleeve out from the rear end 66 of the sleeve mount 62 since the rear end 66 is able to expand via the flexible arms 74.

Since the rear end 66 includes flexible arms 74 that are configured to radially expand, the sleeve insertion operation is performed by inserting the tool 80 into the rear end 66 of the sleeve mount 62. Thus, in inserting the sleeve 63 into the sleeve mount 62, the tool 80 needs to enter the bore 68 from the rear end 66 and push the sleeve 63 into the sleeve retention region 78 of the sleeve mount 62 until the inwardly extending fingers 72 of the front end 64 can abut and stop the sleeve 63. Thus, depending upon the type of operation the tool 80 will be used for, the tool 80 needs to enter the adapter port 48 from the appropriate end. A technician will need to determine the front and rear ends 64, 66 of the sleeve mount 62 before using the tool 80 for removal or insertion of the sleeve 63. And, as will be discussed below in further detail, once the appropriate end of the sleeve mount 62 is identified, the tool 80 must be oriented correctly for the desired operation.

Regarding the orientation of the tool 80, the keys 104 are generally positioned radially around the pin 100 of the plunger 86 so as to match the positioning of the inwardly extending fingers 72, 76 of the sleeve mount 62. As seen in FIGS. 5, 6, 6A, and 16, the plunger handle 98 includes indicia 110 adjacent the rear end 112. One a first side 114 of the handle 98, the indicia 110 represents an insertion action to be performed by the tool 80. According to one example embodiment, the indicia 110 includes the term "IN." On the opposite side 116 of the handle 98, the indicia 110 refers to a removal action to be performed by the tool 80. According to one example embodiment, the indicia 110 includes the term "OUT." When the tool 80 is to be used for removal of a sleeve from the sleeve mount 62, the plunger 86 is oriented with respect to the plunger housing 84 (and thus to the coupling housing 82) such that the term "OUT" faces upwardly. As shown in FIGS. 6 and 6A, when the tool 80 is to be used for insertion of a sleeve 63 into the sleeve mount 62, the plunger 86 is oriented with respect to the plunger housing 84 (and thus to the coupling housing 82) such that the term "IN" faces upwardly. Thus, depending upon the operation the tool 80 is going to be used for, the plunger 86 can be slid out of the plunger housing 84, flipped, and slid back into the plunger housing 84 for the desired operation.

When the term "OUT" faces upwardly with respect to the plunger housing 84, to the coupling housing 82, and also to the adapter 24, the tool 80 is ready to be used as a removal tool 80, and as discussed above, must be inserted into the axial bore 68 from a front end 64 of the sleeve mount 62. When the term "IN" faces upwardly with respect to the plunger housing 84, to the coupling housing 82, and also to the adapter 24, the tool 80 is ready to be used as an insertion tool 80, and as discussed above, must be inserted into the axial bore 68 from a rear end 66 of the sleeve mount 62.

Placing the plunger 86 into the coupling housing 82 in a given orientation determines how the keys 104 will be oriented with respect to the fingers 72, 76 of the sleeve mount 62 and allows the tool 80 to be used for the desired operation at the desired end of the sleeve mount 62. Flipping the plunger 180 degrees from an "IN" orientation to an "OUT" orientation also changes the orientation of the keys 180 degrees (i.e., from an orientation wherein the keys 104 can only slide between the fingers at one end of the sleeve mount 62 to an orientation wherein the keys 104 can only slide between the fingers at the opposite end of the sleeve mount 62). Since the inwardly extending fingers 72 at the front end 64 of the sleeve mount 62 are oriented at an offset relationship to the fingers 76 at the rear end 66 of the sleeve mount 62, depending upon how the plunger 86 is oriented with respect to the plunger housing 84, the plunger 86 can only enter the bore 68 from the appropriate end.

Figure 17:
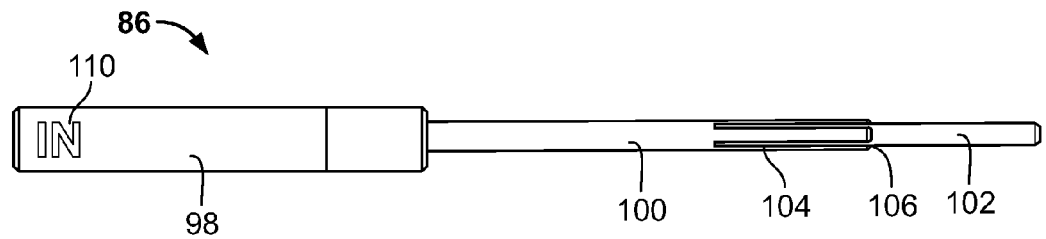
FIG. 17 is a top view of the plunger of FIG. 16.

The plunger 86 of the tool 80 is shown in the insertion orientation in FIG. 17, wherein the keys 104 are positioned to slide between the fingers 76 at the rear end 66 of the sleeve mount 62. As noted, if the plunger 86 is flipped 180 degrees from the orientation shown in FIG. 17, the tool 80 would be in the removal orientation and the keys 104 would be positioned so as to be able to slide between the fingers 72 at the front end 64 of the sleeve mount 62. And, as such, the pin 100 can enter the bore 68 and push the sleeve out.

Figure 18:
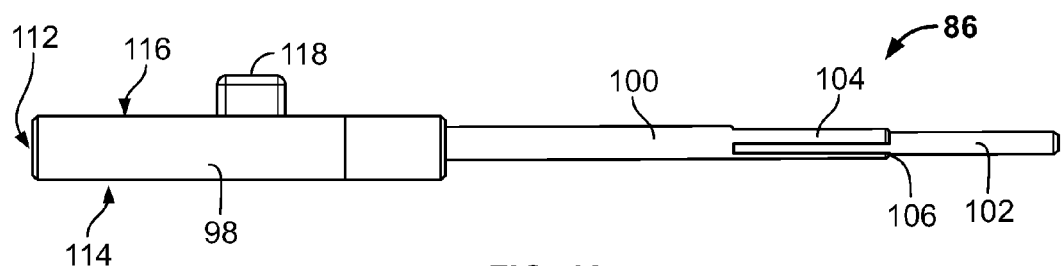
FIG. 18 is a side view of the plunger of FIG. 16.
Figure 19:
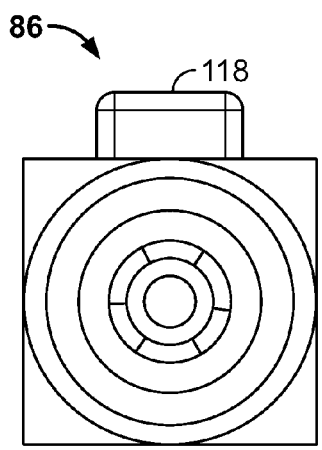
FIG. 19 is a front view of the plunger of FIG. 16.
Figure 20:
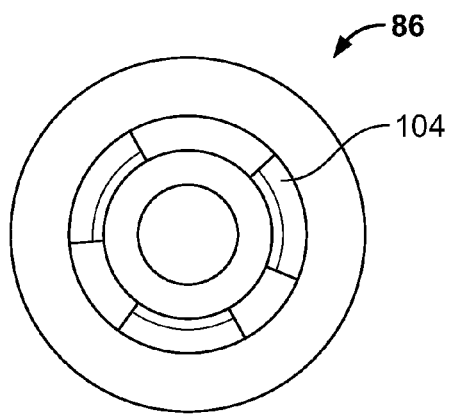
FIG. 20 is a close up view of a portion of the plunger illustrated in FIG. 19.

FIG. 18 illustrates the plunger 86 flipped 90 degrees from the orientation in FIG. 17. In FIG. 18, a stop member 118 of the plunger 86 is illustrated. The stop member 118 is configured to abut a stop surface 120 within the plunger housing 84 to limit or stop forward movement of the plunger 86 within the plunger housing 84 in either operation.

In using the tool 80 for removing a ferrule alignment sleeve from a sleeve mount 62 of an adapter 24, the front end 64 (i.e., fully circular end) of the sleeve mount 62 must first be identified. Once the front end 64 is identified, the coupling housing 82, along with the plunger housing 84, is snapped into the adapter port 48a, similar to a fiber optic connector 26, using the latch 88. Once the coupling and plunger housings 82, 84 are fixed with respect to the adapter 24, the plunger 86 must now be oriented correctly with respect to the plunger housing 84 such that the indicia 110 representing a removal operation is facing upwardly with respect to the plunger housing 84 and the coupling housing 82. If the plunger 86 is in the opposite orientation, the plunger 86 can be flipped 180 degrees before being slid into the plunger housing 84.

Once the plunger 86 is oriented correctly, the plunger 86 is pushed forwardly using the handle portion 98. The pin 100 will enter the bore 68 from the front end 64 of the sleeve mount 62 and slide into the sleeve until the abutment surfaces 106 of the keys 104 reach and contact the sleeve. Further advancement of the plunger 86 will force the sleeve to be pushed out from the rear end 66. During this operation, the keys 104 are oriented such that they can slide between the inwardly extending fingers 72. And, since the rear end 66 of the sleeve mount 62 is the end with the flexible arms 74 that can expand, the sleeve is pushed out from the rear end 66. As noted above, the stop member 118 of the plunger 86 contacts the stop surface 120 of the plunger housing 84 to prevent further forward advancement of the plunger 86 therewithin. Once the sleeve has been removed, the plunger 86 is pulled back rearwardly with respect to the plunger housing 84.

In using the tool 80 for inserting a ferrule alignment sleeve into the sleeve mount 62 of an adapter 24, the rear end 66 (i.e., the end with the flexible arms 74) of the sleeve mount 62 must first be identified. Once the rear end 66 is identified, the coupling housing 82, along with the plunger housing 84, is snapped into the adapter port 48b, similar to a fiber optic connector 26, using the latch 88. Once the coupling and plunger housings 82, 84 are fixed with respect to the adapter 24, the plunger 86 must now be oriented correctly with respect to the plunger housing 84 such that the indicia 110 representing an insertion operation is facing upwardly with respect to the plunger housing 84 and the coupling housing 82. If the plunger 86 is in the opposite orientation, the plunger 86 can be flipped 180 degrees before being slid into the plunger housing 84.

As shown in FIG. 6A, once the plunger 86 is oriented correctly, a ferrule alignment sleeve 63 is slidably placed on the sleeve receiving portion 102 of the pin 100. The sleeve 63 is slid on the pin 100 until it contacts the abutment surfaces 106 of the keys 104. Once the sleeve 63 is on the pin 100 and the plunger 86 has been oriented correctly, the plunger 86 is pushed forwardly using the handle portion 98. As the pin 100 and the sleeve 63 at the front end of the pin 100 enter the bore 68 from the rear end 66 of the sleeve mount 62, the sleeve 63 contacts and forces the flexible arms 74 radially outwardly. The sleeve 63 is advanced within the axial bore 68 until it abuts the inwardly extending fingers 72 at the front end 64. It should be noted that at this point, the keys 104 have entered the bore 68. Since the keys 104 are oriented to be positioned in between the fingers 76 at the rear end 66, the keys 104 allow the flexible arms 74 to snap back into place radially inwardly in capturing the sleeve 63 within the sleeve retention 78 region of the sleeve mount 62. If the keys 104 did not align with the gaps between the fingers 76 at the rear end 66, the flexible arms 74 would not be able to flex back inwardly to capture the sleeve 63 therein and would stay flexed outwardly. The keys 104 ensure that there is room for the flexible arms 74 to move back inwardly once the sleeve 63 has advanced to the point where it has cleared the fingers 76. Once insertion is complete, the plunger 86 is pulled rearwardly with respect to the plunger housing 84 using the handle 98.

It should be noted that in the depicted embodiment of the LC adapter 24 of the present disclosure, as shown in FIG. 3, a rear outward end 122 of the sleeve mount 62 may include a slight taper 124 that might facilitate the sleeve 63 forcing the flexible arms 74 radially outwardly when contacting the arms 74.

FIGS. 21-34 illustrate another embodiment of a tool 180 used for insertion of a ferrule alignment sleeve into a fiber optic adapter sleeve mount 62. The tool 180 of FIGS. 21-34 is similar in configuration and operation in certain aspects to the tool 80 of FIGS. 5-20. The tool 180 is designed with an "L" shaped configuration for use in inserting ferrule alignment sleeves in adapters 24 located in environments where there is limited room in front of the adapter ports 48. The tool 180 of FIGS. 21-34 is designed to be an insertion only tool and does not provide for a plunging operation. Thus, the pin 200 of the tool 180 is fixedly coupled thereto and is oriented only for an insertion operation.

Still referring to FIGS. 21-34, the tool 180 includes a handle 198, a pin mount 199, and a pin 200 that is coupled to the pin mount 199. The pin 200 extends from the pin mount 199 at a transverse direction with respect to the handle 198 to create the "L" shaped configuration.

As shown in isolation in FIGS. 31-34, the pin 200 includes a sleeve receiving portion 202 and keying elements 204 similar to the pin 100 of the tool 80 of FIGS. 5-20. As noted above, the keys 204 are oriented to slide between the fingers 76 of the rear end 66 of the sleeve mount 62 when the handle 198 is held by a technician in the upright position. In this manner, the tool 180 is used as an insertion tool.

In use, once a technician identifies the rear end 66 of the sleeve mount 62, the sleeve is placed on the sleeve receiving portion 202 of the pin 200 until it abuts the abutment surfaces 206 of the keys 204. Once placed thereon, the pin 200 and the sleeve are slid into the axial bore 68 of the sleeve mount 62 from the rear end 66 until the sleeve is snapped into the sleeve mount 62 as described above with respect to the tool 80 of FIGS. 5-20.

The pin mount 199 of the tool 80 defines a stop surface 220 that abuts a face of the adapter 24 in stopping further forward advancement of the pin 200 within the bore 68. Once the sleeve is placed within the sleeve retention region 78 of the sleeve mount 62, the tool 180 is pulled away from the adapter port 48 using the handle 198.

Figure 35:
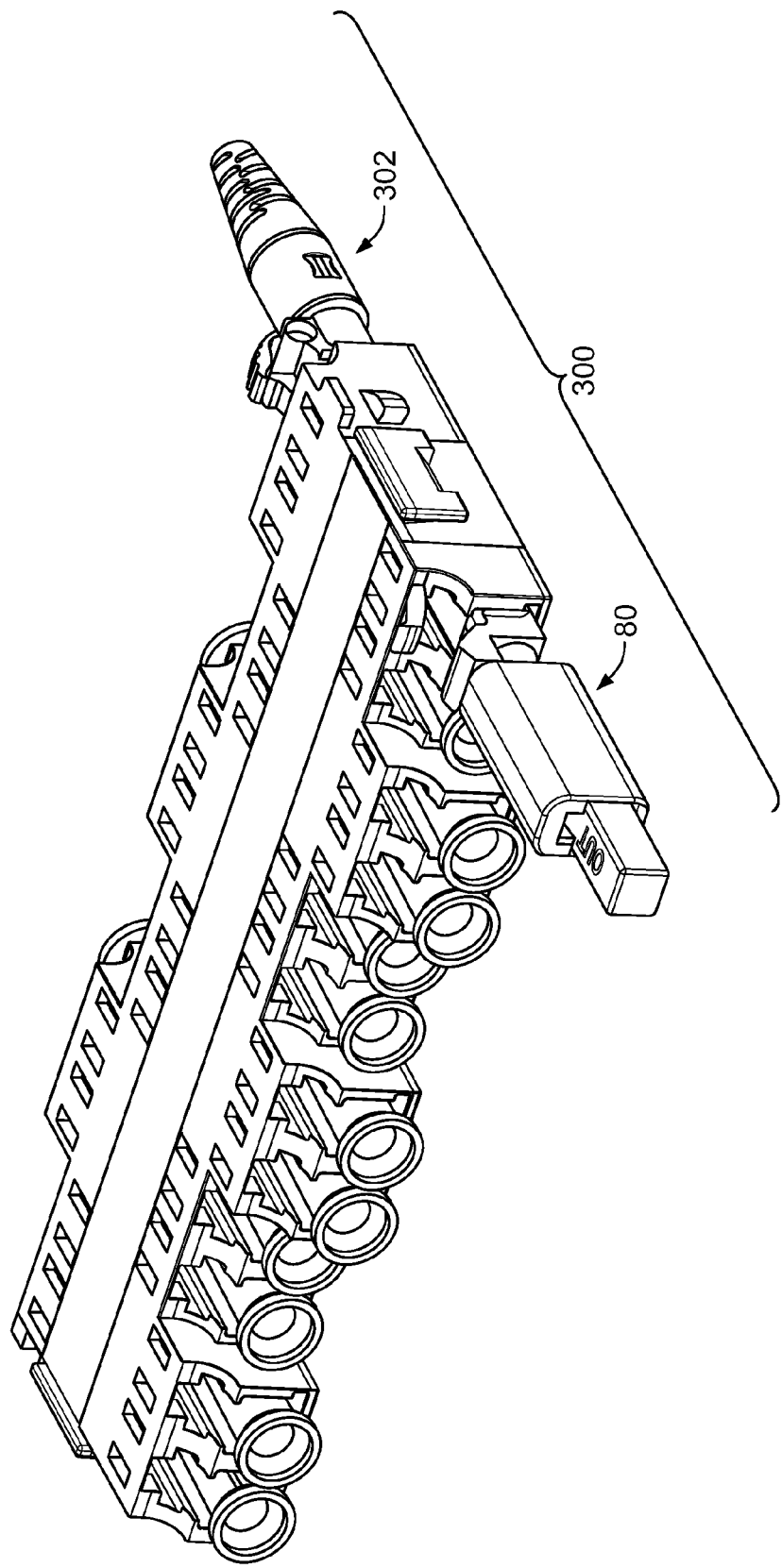
FIG. 35 illustrates the ferrule alignment sleeve insertion/removal tool being used with the adapter block of FIG. 5 in removing the ferrule alignment sleeve from the adapter in combination with a sleeve catcher having features that are examples of inventive aspects in accordance with the principles of the present disclosure.
Figure 36:
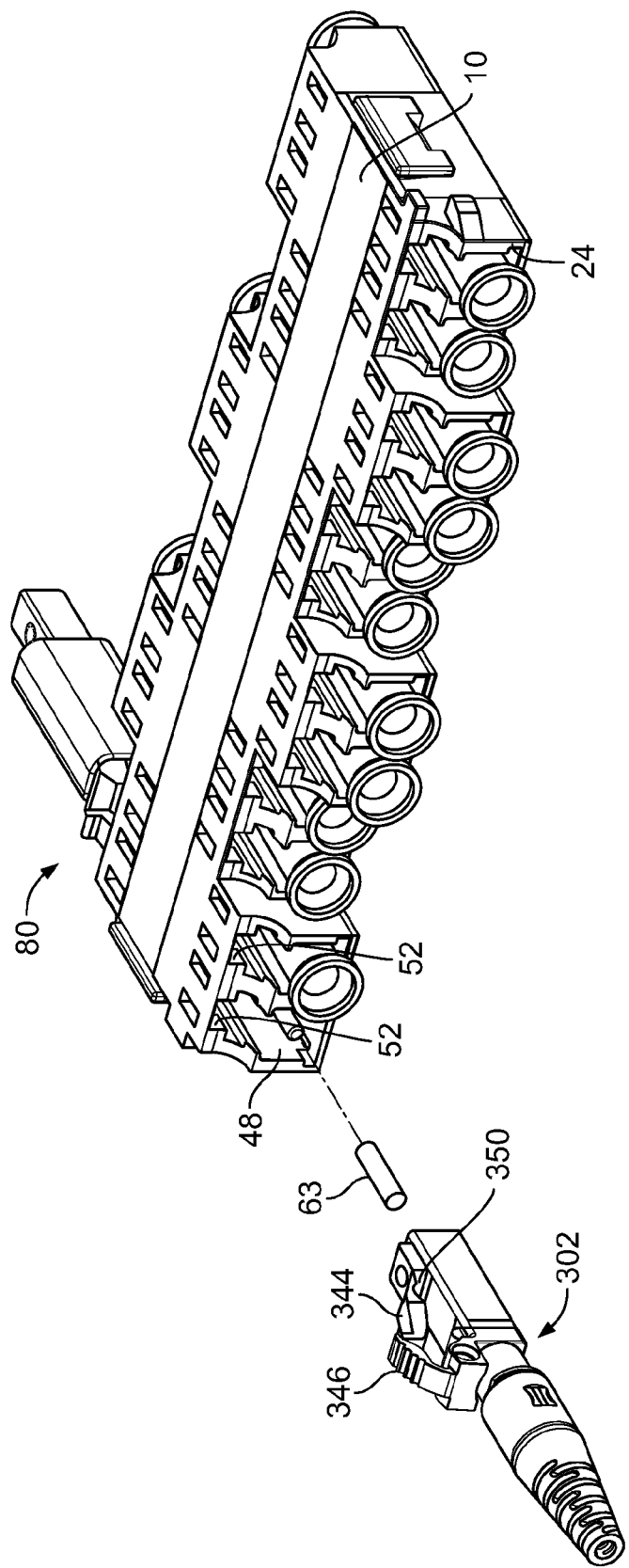
FIG. 36 illustrates the sleeve catcher and a ferrule alignment sleeve being removed from the adapter of FIG. 35 in an exploded configuration.
Figure 37:
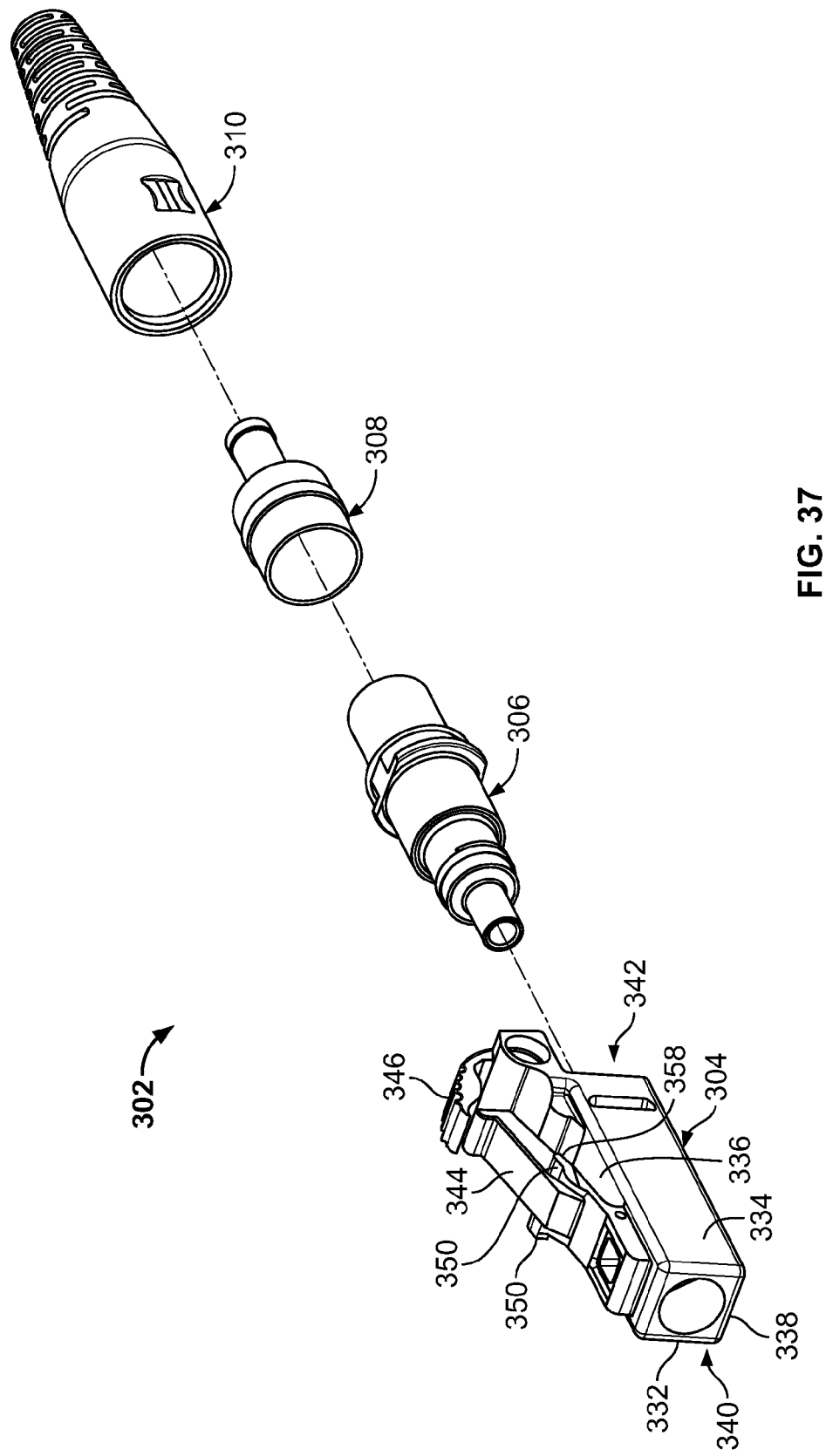
FIG. 37 illustrates a view of the sleeve catcher of FIGS. 35 and 36 in isolation in an exploded configuration.

Referring now to FIGS. 35-37, according to another aspect of the disclosure, the tools of the present disclosure such as tool 80 may be provided as part of a kit 300 that also includes a sleeve catcher 302 for catching the ferrule alignment sleeve 63 being removed from an adapter 24. As shown in FIG. 35, the sleeve catcher 302 is configured to be mounted to an open end of a fiber optic adapter 24 opposite from the tool 80 and block the open end for catching the sleeve 63 when the sleeve 63 is removed. The sleeve 63 and the sleeve catcher 302 are shown in an exploded configuration in FIG. 36. Since the ferrule alignment sleeve 63 is removed by being forced out with the pin 100 of the plunger 86 and by expanding the flexible arms 74, the sleeve 63 may spring out of the adapter port 48 at high speed. The sleeve catcher 302 may prevent losing the ferrule alignment sleeve 63 once it exits the sleeve mount 62.

According to one example embodiment, the sleeve catcher 302 may be configured as a standard fiber optic connector (e.g., an LC connector 26 according to one embodiment) that is not terminated to any cabling. The sleeve catcher 302 that is shaped, for example, as an LC-type fiber optic connector 26 can mount to the opposite end of the adapter 24 with a standard snap-fit lock as is known for LC connectors 26.

FIG. 37 illustrates one example configuration for the sleeve catcher 302 that is generally shaped as an LC connector that is not terminated to any cabling. The sleeve catcher 302 is shown in an exploded configuration in FIG. 37. As known for certain LC connectors 26, the sleeve catcher 302 includes a front housing 304, a rear insert 306 that is coupled to the front housing 304 with a snap-fit, a crimp sleeve 308 that is coupled to the rear insert 306 (normally used for crimping strength members of fiber optic cables to the rear insert), and a boot 310 placed over the crimp sleeve 308 and over a portion of the rear insert 306 (normally used to provide bend radius protection for fibers of a fiber optic cable).

Referring to FIGS. 35-37, as noted above, the front housing 304 of the sleeve catcher 302 may form the portion of the catcher 302 that defines an LC-type footprint for coupling to LC-type fiber optic adapters 24, on an opposite end from the tool 80. The front housing 304 of the sleeve catcher 302, similar to an LC connector 26, includes opposing sidewalls 332, 334, a top wall 336, a bottom wall 338, a front end 340, and a rear end 342. As in an LC connector, the front housing 304 may be formed from a molded polymeric material. The front housing 304 of the sleeve catcher 302 defines a latch 344 extending from the top wall 336 thereof toward the rear end 342, the latch 344 extending at an acute angle with respect to the top wall 336 of the front housing 304. Similar to an LC-type connector 26, the sleeve catcher may also include a latch trigger 346 that extends from the rear end 342 of the connector housing 304 toward the front end 340. The latch trigger 346 also normally extends at an acute angle with respect to the top wall 336. The latch trigger 346 is configured to come into contact with the latch 344 for flexibly moving the latch 344 downwardly.

When the sleeve catcher 302 is placed in an adapter 24 for catching the ferrule alignment sleeve 63, the latch 344 functions to lock the sleeve catcher 302 in place within a port of the adapter 24. Similar to LC connectors, the latch 344 may include a pair of catches 350, each one extending from a side of the latch 344. Within each adapter port 48 of the adapter 24 is a pair of symmetrically disposed retaining shoulders 52. The shoulders 52 are configured to interact with the catches 350 of the latch 344 to deflect the latch 344 downwardly (i.e., toward the central axis of the sleeve catcher 302). Once inserted therein, the shoulders 52 are configured to interact with a vertical surface 358 of a catch 350 to lock the sleeve catcher 302 within the adapter 24.

Similar to an LC connector 26, during insertion, the interaction between the catches 350 of the latch 344 of the sleeve catcher and the shoulders 52 cause the latch 344 to move downwardly. The latch 344 springs back (upwardly) after insertion is complete. Thereafter, the shoulders 52 interact with the vertical surfaces 358 on the catches 350 of the latch 344 to lock the sleeve catcher into the adapter 24.

Removal of the sleeve catcher 302, after the ferrule alignment sleeve has been caught, is normally accomplished by manually depressing the latch 344 downwardly and pulling the sleeve catcher away from the adapter port 48. As noted above for LC connectors 26, the latch trigger 346 may be used to provide greater access to the latch 344 and may be configured to come into contact with the latch 344 for flexibly moving the latch 344 downwardly. When the latch trigger 346 is depressed, the interaction between the latch trigger 346 and the latch 344 causes the latch 344 to be pressed in a downward direction, freeing the catch portions 350 of the latch 344 from the shoulders 52 in removing the sleeve catcher.

Although the present disclosure includes a discussion of sleeve insertion/removal tools for ferrule alignment sleeves and sleeve catchers associated with adapters having an LC-type footprint, it should be noted that the tools and/or the sleeve catchers of the present disclosure may be used or modified to be used for insertion and removal of ferrule alignment sleeves that might be found in adapters having other footprints such as SC-type adapters. LC-type adapters 24 have been used to simply illustrate and describe the inventive features of the tools and sleeve catchers herein and should not be used to limit the scope of the present disclosure.

Although in the foregoing description of the ferrule alignment sleeve insertion/removal tools and sleeve catchers, terms such as "top," "bottom," "upper," "lower," "front," "back," "rear," "right," and "left" might be have been used for ease of description and illustration, no restriction is intended by such use of the terms. The tools and/or sleeve catchers described herein can be used in any orientation.

Having described the preferred aspects and embodiments of the present disclosure, modifications and equivalents of the disclosed concepts may readily occur to one skilled in the art. However, it is intended that such modifications and equivalents be included within the scope of the claims which are appended hereto.

What is claimed is:

1. A tool for inserting a ferrule alignment sleeve within a sleeve mount of a fiber optic adapter, the sleeve mount defining an axial bore and radially inwardly extending fingers for retaining the ferrule alignment sleeve therewithin, the tool comprising:
   a handle; and
   a pin extending from the handle, the pin defining a front end and a sleeve receiving portion extending from the front end rearwardly toward the handle, the sleeve receiving portion of the pin sized in radial cross-dimension to slidably receive the ferrule alignment sleeve, the pin defining longitudinal keys positioned circumferentially around the pin for mating with gaps defined between the radially inwardly extending fingers of the sleeve mount, the longitudinal keys defining longitudinal slots in between the longitudinal keys that are positioned circumferentially around the pin, the longitudinal keys extending from the sleeve receiving portion rearward toward the handle and defining an abutment surface for the ferrule alignment sleeve at a rear end of the sleeve receiving portion of the pin.

2. The tool according to claim 1, wherein the pin forms at least a portion of a plunger that is telescopically slidable with respect to an outer housing of the tool.

3. The tool according to claim 2, wherein both the pin and the handle are telescopically slidable with respect to the outer housing of the tool.

4. The tool according to claim 1, wherein the pin defines three longitudinal keys positioned circumferentially around the pin, the three longitudinal keys allowing the tool to be used in two different orientations with respect to the fiber optic adapter, wherein a first orientation is used in inserting the pin into the sleeve mount from a first end and a second orientation is used in inserting the pin into the sleeve mount from an opposite second end of the sleeve mount.

5. The tool according to claim 4, wherein the first orientation is 180 degrees apart from the second orientation.

6. The tool according to claim 4, wherein the plunger includes separate indicia for orienting the tool in the first and second orientations.

7. The tool according to claim 1, further comprising a coupling housing from which the pin extends, the coupling housing configured to be coupled to a fiber optic adapter with a snap-fit interlock for locking the tool to the fiber optic adapter.

8. The tool according to claim 7, wherein the coupling housing defines a flexible latch for mounting to an LC-type fiber optic adapter.

* * * * *